United States Patent
Splaine et al.

(10) Patent No.: US 10,681,497 B2
(45) Date of Patent: *Jun. 9, 2020

(54) METHODS AND APPARATUS TO ASSOCIATE GEOGRAPHIC LOCATIONS WITH USER DEVICES

(71) Applicant: The Nielsen Company (US), LLC, New York, NY (US)

(72) Inventors: Steven J. Splaine, Tampa, FL (US); Arun Ramaswamy, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,372

(22) Filed: Sep. 9, 2019

(65) Prior Publication Data
US 2020/0008011 A1    Jan. 2, 2020

Related U.S. Application Data

(63) Continuation of application No. 16/405,805, filed on Aug. 20, 2018, now Pat. No. 10,412,547, which is a
(Continued)

(51) Int. Cl.
*H04W 24/00* (2009.01)
*H04W 4/02* (2018.01)
*G06Q 30/02* (2012.01)

(52) U.S. Cl.
CPC ........ *H04W 4/023* (2013.01); *G06Q 30/0242* (2013.01)

(58) Field of Classification Search
None
See application file for complete search history.

(56) References Cited

U.S. PATENT DOCUMENTS 5,796,952 A   8/1998   Davis et al.
5,862,325 A   1/1999   Reed et al.
(Continued)

FOREIGN PATENT DOCUMENTS

JP    2012216196    11/2012
KR    20120082390   7/2012

OTHER PUBLICATIONS

IP Australia. "Patent Examination Report No. 1." issued in connection with Australian Patent Application No. 2013205028. dated Dec. 19, 2014 (3 pages). (not provided—Document available in Parent U.S. Appl. No. 15/818,715.).
(Continued)

*Primary Examiner* — Erika A Washington
(74) *Attorney, Agent, or Firm* — Hanley, Flight & Zimmerman, LLC

(57) ABSTRACT

Methods, apparatus, systems and articles of manufacture are disclosed to associate geographic locations with user devices. An example apparatus includes means for classifying a network that connects a user device to an audience measurement entity based on source identifying information transmitted from the user device, means for determining a geographic location associated with an impression indicated by media identifying information, and means for classifying the geographic location of the user device as a home location based on a timestamp associated with the impression, the timestamp retrieved from a database of user profiles.

16 Claims, 13 Drawing Sheets

Related U.S. Application Data continuation of application No. 15/818,715, filed on Nov. 20, 2017, now Pat. No. 10,057,718, which is a continuation of application No. 14/880,381, filed on Oct. 12, 2015, now Pat. No. 9,826,359.

(60) Provisional application No. 62/155,986, filed on May 1, 2015.

(56) References Cited

U.S. PATENT DOCUMENTS

| | | | |
|---|---|---|---|
| 6,108,637 | A | 8/2000 | Blumenau |
| 6,138,155 | A | 10/2000 | Davis et al. |
| 6,286,046 | B1 | 9/2001 | Dryant |
| 6,418,470 | B2 | 7/2002 | Blumenau |
| 6,529,952 | B1 | 3/2003 | Blumenau |
| 6,611,835 | B1 | 8/2003 | Huang et al. |
| 6,708,215 | B1 | 3/2004 | Hingorani et al. |
| 6,763,386 | B2 | 7/2004 | Davis et al. |
| 6,931,397 | B1 | 8/2005 | Sundaresan |
| 7,200,673 | B1 | 4/2007 | Augart |
| 7,216,149 | B1 | 5/2007 | Briscoe et al. |
| 7,299,050 | B2 | 11/2007 | Delaney et al. |
| 7,451,229 | B2 | 11/2008 | Klemets et al. |
| 7,475,352 | B2 | 1/2009 | Yolleck et al. |
| 7,523,409 | B2 | 4/2009 | Yolleck et al. |
| 7,600,014 | B2 | 10/2009 | Russell et al. |
| 7,917,154 | B2 | 3/2011 | Fortescue et al. |
| 8,020,083 | B1 | 9/2011 | Kembel et al. |
| 8,078,651 | B2 | 12/2011 | Desai et al. |
| 8,078,691 | B2 | 12/2011 | Zhang et al. |
| 8,181,194 | B2 | 5/2012 | Houston |
| 8,191,007 | B1 | 5/2012 | Veloz, III |
| 8,238,922 | B2 | 8/2012 | Parameswar |
| 8,370,489 | B2 | 2/2013 | Mazumdar et al. |
| 8,401,003 | B1 | 3/2013 | Petit-Huguenin et al. |
| 8,478,904 | B2 | 7/2013 | Jungck |
| 8,499,065 | B2 | 7/2013 | Ross et al. |
| 8,560,675 | B2 | 10/2013 | Honnold et al. |
| 8,577,392 | B1 | 11/2013 | Pai et al. |
| 8,607,295 | B2 | 12/2013 | Bhatia et al. |
| 8,631,473 | B2 | 1/2014 | Bhatia et al. |
| 8,635,674 | B2 | 1/2014 | Bhatia et al. |
| 8,667,520 | B2 | 3/2014 | Bhatia et al. |
| 8,682,904 | B1 | 3/2014 | Weber |
| 8,717,608 | B2 | 5/2014 | Takahashi |
| 8,825,085 | B1 | 9/2014 | Boyle et al. |
| 8,965,326 | B2 | 2/2015 | Michaelis et al. |
| 9,826,359 | B2 | 11/2017 | Splaine et al. |
| 10,057,718 | B2 * | 8/2018 | Splaine ............... H04W 4/023 |
| 2002/0038349 | A1 | 3/2002 | Perla et al. |
| 2002/0143933 | A1 | 10/2002 | Hind et al. |
| 2003/0070167 | A1 | 4/2003 | Holtz et al. |
| 2003/0187677 | A1 | 10/2003 | Malireddy et al. |
| 2003/0225858 | A1 | 12/2003 | Keohane et al. |
| 2006/0212792 | A1 | 9/2006 | White et al. |
| 2006/0265416 | A1 | 11/2006 | Seki et al. |
| 2007/0162448 | A1 | 7/2007 | Jain et al. |
| 2007/0260589 | A1 | 11/2007 | Yugami |
| 2007/0271375 | A1 | 11/2007 | Hwang |
| 2008/0005686 | A1 | 1/2008 | Singh |
| 2008/0046562 | A1 | 2/2008 | Butler |
| 2008/0086559 | A1 | 4/2008 | Davis et al. |
| 2008/0243822 | A1 | 10/2008 | Campbell et al. |
| 2008/0255944 | A1 | 10/2008 | Shah et al. |
| 2009/0177768 | A1 | 7/2009 | Kind et al. |
| 2009/0271514 | A1 | 10/2009 | Thomas et al. |
| 2009/0328063 | A1 | 12/2009 | Corvera et al. |
| 2010/0077092 | A1 | 3/2010 | Akaboshi |
| 2010/0131835 | A1 | 5/2010 | Kumar et al. |
| 2010/0185940 | A1 | 7/2010 | Popp et al. |
| 2010/0268540 | A1 | 10/2010 | Arshi et al. |
| 2010/0268573 | A1 | 10/2010 | Jain et al. |
| 2010/0312596 | A1 | 12/2010 | Saffari et al. |
| 2010/0313142 | A1 | 12/2010 | Brown |
| 2011/0004682 | A1 | 1/2011 | Honnold et al. |
| 2011/0041090 | A1 | 2/2011 | Seolas et al. |
| 2011/0060845 | A1 | 3/2011 | Jungck |
| 2011/0078703 | A1 | 3/2011 | Dokovski et al. |
| 2011/0082984 | A1 | 4/2011 | Yuan |
| 2011/0087780 | A1 | 4/2011 | McCann et al. |
| 2011/0119100 | A1 | 5/2011 | Ruhl et al. |
| 2011/0202888 | A1 | 8/2011 | Rusu et al. |
| 2011/0246641 | A1 | 10/2011 | Pugh et al. |
| 2011/0251902 | A1 | 10/2011 | Nagarajayya |
| 2012/0030338 | A1 | 2/2012 | Zhang et al. |
| 2012/0047203 | A1 | 2/2012 | Brown et al. |
| 2012/0059696 | A1 | 3/2012 | Theberge et al. |
| 2012/0066378 | A1 | 3/2012 | Lui et al. |
| 2012/0158954 | A1 | 6/2012 | Heffernan et al. |
| 2012/0239407 | A1 | 9/2012 | Lynch et al. |
| 2012/0324101 | A1 | 12/2012 | Pecjack et al. |
| 2013/0014136 | A1 | 1/2013 | Bhatia et al. |
| 2013/0036434 | A1 | 2/2013 | Shkedi et al. |
| 2013/0151339 | A1 | 6/2013 | Kim et al. |
| 2013/0212188 | A1 | 8/2013 | Duterque et al. |
| 2013/0311478 | A1 | 11/2013 | Frett et al. |
| 2014/0019589 | A1 | 1/2014 | Ross et al. |
| 2014/0068411 | A1 | 3/2014 | Ross et al. |
| 2014/0278934 | A1 | 9/2014 | Gutierrez |
| 2014/0325551 | A1 | 10/2014 | McMillan |
| 2015/0032905 | A1 | 1/2015 | Celebi et al. |
| 2015/0098554 | A1 | 4/2015 | Winterbottom et al. |
| 2018/0359605 | A1 | 12/2018 | Splaine et al. |
| 2019/0378161 | A1 | 12/2019 | Gutierrez |

OTHER PUBLICATIONS

International Searching Authority, "International Search Report and the Written Opinion of the International Searching Authority," issued in connection with corresponding International Patent Application No. PCT/US2014/029803, dated Aug. 26, 2014 (9 pages). (not provided—Document available in Parent U.S. Appl. No. 15/818,715).

United States Patent and Trademark Office, "Non-Final Office Action," issued in connection with U.S. Appl. No. 13/841,762, dated Jan. 30, 2015, 32 pages. (not provided as this is a USPTO document. Applicant will provide document upon request from Examiner.).

United States Patent and Trademark Office, "Non-Final Office Action," issued in connection with U.S. Appl. No. 13/841,762, dated Aug. 28, 2015, 37 pages. (not provided as this is a USPTO document. Applicant will provide document upon request from Examiner.).

International Searching Authority, "International Premilinary Report on Patentability," issued in connection with corresponding International Patent Application No. PCT/US2014/029803, dated Sep. 15, 2015, 5 pages. (not provided—Document available in Parent U.S. Appl. No. 15/818,715).

Scripting and Ajax, published by WrC.org published 2010, edited by Dominique Hazael-Massieux, retrieved from <http://www.w3.org/standards/webdesign/script.Html>, 3 pages. (not provided—Document available in Parent U.S. Appl. No. 15/818,715).

United States Patent and Trademark Office, "Non-Final Office Action," issued in connection with U.S. Appl. No. 12/895,288, dated Jul. 5, 2012 (12 pages). (not provided as this is a USPTO document. Applicant will provide document upon rquest from Examiner.).

United States Patent and Trademark Office, "Notice of Allowance," issued in connection with U.S. Appl. No. 12/895,288, dated Mar. 29, 2013 (11 pages). (not provided as this is a USPTO document. Applicant will provide document upon request from Examiner.).

United States Patent and Trademark Office, "Restriction Requirement", issued in connection with U.S. Appl. No. 13/953,176, dated Aug. 22, 2014 (6 pages). (not provided as this is a USPTO document. Applicant will provide document upon request from Examiner.).

United States Patent and Trademark Office, "Non-Final Office Action", issued in connection with U.S. Appl. No. 13/953,176,

(56) References Cited

OTHER PUBLICATIONS dated Aug. 22, 2014 (7 pages). (not provided as this is a USPTO document. Applicant will provide document upon request from Examiner.).
United States Patent and Trademark Office, "Non-Final Office Action," issued in connection with U.S. Appl. No. 13/630,818, dated Nov. 24, 2014, 23 pages. (not provided as this is a USPTO document. Applicant will provide document upon request from Examiner.).
United States Patent and Trademark Office, "Final Office Action," issued in connection with U.S. Appl. No. 13/630,818, dated Apr. 9, 2015, 29 pages. (not provided as this is a USPTO document. Applicant will provide document upon request from Examiner.).
United States Patent and Trademark Office, "Non-Final Office Action," issued in connection with U.S. Appl. No. 13/630,818, dated Sep. 16, 2015, 43 pages. (not provided as this is a USPTO document. Applicant will provide document upon request from Examiner.).
United States Patent and Trademark Office, "Final Office Action," issued in connection with U.S. Appl. No. 13/841,762, dated Mar. 25, 2016, 26 pages. (not provided as this is a USPTO document. Applicant will provide document upon request from Examiner.).
European Patent Office, "Extended European Search Report," issued in connection with International Patent Application No. PCT/US2014029803, dated Sep. 8, 2016, 9 pages. (not provided—Document available in U.S. Appl. No. 15/818,715).
United States Patent and Trademark Office, "Final Office Action," issued in connection with U.S. Appl. No. 13/841,762, dated Dec. 29, 2016, 33 pages. (not provided as this is a USPTO document. Applicant will provide document upon request from Examiner.).
United States Patent and Trademark Office, "Non-Final Office Action," issued in connection with U.S. Appl. No. 14/880,381, dated Feb. 1, 2017, 22 pages. (not provided as this is a USPTO document. Applicant will provide document upon request from Examiner.).
United States Patent and Trademark Office, "Notice of Allowance," issued in connection with U.S. Appl. No. 14/880,381, dated Jul. 19, 2017, 14 pages. (not provided as this is a USPTO document. Applicant will provide document upon request from Examiner.).
United States Patent and Trademark Office, "Final Office Action", issued in connection with U.S. Appl. No. 13/630,818, dated Apr. 4, 2017 (71 pages). (not provided as this is a USPTO document. Applicant will provide document upon request from Examiner.).
United States Patent and Trademark Office, "Non-Final Office Action," issued in connnection with U.S. Appl. No. 13/841,762, dated Sep. 14, 2017, 50 pages. (not provided as this is a USPTO document. Applicant will provide document upon request from Examiner.).
State Intellectual Property Office of China, "First Notification of Office Action," issued in connection with Chinese Patent Application No. 201480027150, dated Sep. 28, 2017, 17 pages. (not provided—Document available in Parent U.S. Appl. No. 15/818,715).
IP Australia, "Notice of Acceptance," issued in connection with Australian Patent Application No. 2016213858, dated Nov. 10, 2017, 3 pages. (not provided—Document available in Parent U.S. Appl. No. 15/818,715).
United States Patent and Trademark Office, "Final Office Action," issued in connection with U.S. Appl. No. 13/841,762, dated Mar. 12, 2018, 36 pages. (not provided as this is a USPTO document. Applicant will provide document upon request from Examiner.).
IP Australia, "Certificate of Grant," issued in connection with application No. 2016213858, dated Mar. 8, 2018, 1 page. (not provided—Document available in Parent U.S. Appl. No. 15/818,715).
United States Patent and Trademark Office, "Notice of Allowance," issued in connection with U.S. Appl. No. 15/818,715, dated Apr. 19, 2018, 22 pages. (not provided as this is a USPTO document. Applicant will provide document upon request from Examiner.).
United States Patent and Trademark Office, "Non-Final Office Action," issued in connection with U.S. Appl. No. 15/818,715, dated Dec. 26, 2017, 7 pages. (not provided as this is a USPTO document. Applicant will provide document upon request from Examiner.).
United States Patent and Trademark Office, "Non-Final Office Action," issued in connection with U.S. Appl. No. 16/105,805, dated Sep. 14, 2018, 8 pages. (not provided as this is a USPTO document. Applicant will provide document upon request from Examiner.).
United States Patent and Trademark Office, "Final Office Action," issued in connection with U.S. Appl. No. 16/105,805, dated Feb. 19, 2019, 7 pages. (not provided as this is a USPTO document. Applicant will provide document upon request from Examiner.).
United States Patent and Trademark Office, "Notice of Allowance," issued in connection with U.S. Appl. No. 16/105,805, dated Apr. 26, 2019, 8 pages. (not provided as this is a USPTO document. Applicant will provide document upon request from Examiner.).

\* cited by examiner

| Impression Identifier (705) | Source Information (710) | User Identifier (715) | Location Services Identifier (720) | Media Identifier (725) | Time Stamp (730) | Network Connection-Type (735) | Location Identifier (740) | Geographic Location (745) | Business Location? (750) |
|---|---|---|---|---|---|---|---|---|---|
| 0001 | IPAddr 01 | User 01 | N/A | Host1.com | 1/1/2015 8:00 AM | Wi-Fi | IPAddr 01 | Chicago, Illinois | No |
| 0002 | IPAddr 02 | User 02 | Lat 2, Long 2 | Host2.com | 1/2/2015 9:15 AM | Cellular | Lat 2, Long 2 | Austin, Texas | No |
| ⋮ | ⋮ | ⋮ | ⋮ | ⋮ | ⋮ | ⋮ | ⋮ | ⋮ | ⋮ |
| 0043 | IPAddr 03 | User 03 | N/A | Host3.com | 1/2/2015 9:45 AM | Cellular | Lat 3, Long 3 | Dallas, Texas | Yes |
| ⋮ | ⋮ | ⋮ | ⋮ | ⋮ | ⋮ | ⋮ | ⋮ | ⋮ | ⋮ |

Tagged Impressions Logged by the AME Server

FIG. 7

| User Identifier ~805 | User Home Location ~810 | Gender ~815 | Age ~820 | Presence of Children ~825 | User Interests ~830 |
|---|---|---|---|---|---|
| User 01 | Chicago, Illinois | Male | 30-34 | No | Cars Grilling |
| User 02 | Austin, Texas | N/A | N/A | N/A | N/A |
| ⋮ | ⋮ | ⋮ | ⋮ | ⋮ | ⋮ |
| User 03 | N/A | Female | 35-39 | Yes | Sports |
| ⋮ | ⋮ | ⋮ | ⋮ | ⋮ | ⋮ |

User Profiles

METHODS AND APPARATUS TO ASSOCIATE GEOGRAPHIC LOCATIONS WITH USER DEVICES

RELATED APPLICATION

This patent arises from a continuation of U.S. patent application Ser. No. 16/105,805, now U.S. Pat. No. 10,412, 547, entitled "Methods and Apparatus to Associate Geographic Locations with User Devices," filed Aug. 20, 2018, which is a continuation of U.S. patent application Ser. No. 15/818,715, now U.S. Pat. No. 10,057,718, entitled "Methods and Apparatus to Associate Geographic Locations with User Devices," filed Nov. 20, 2017, which is a continuation of U.S. patent application Ser. No. 14/880,381, now U.S. Pat. No. 9,826,359, entitled "Methods and Apparatus to Associate Geographic Locations with User Devices," filed Oct. 12, 2015, which claims the benefit of U.S. Provisional Patent Application No. 62/155,986, filed May 1, 2015, entitled "Methods and Apparatus to Associate Geographic Locations with Mobile Devices." The entire disclosures of U.S. patent application Ser. No. 16/105,805, U.S. patent application Ser. No. 15/818,715, U.S. patent application Ser. No. 14/880,381, and U.S. Provisional Patent Application No. 62/155,986 are hereby incorporated by reference in their entirety.

FIELD OF THE DISCLOSURE

This disclosure relates generally to audience measurement, and, more particularly, to methods and apparatus to associate geographic locations with user devices.

BACKGROUND

Audience measurement of media (e.g., any type of content and/or advertisements such as broadcast television and/or radio, stored audio and/or video played back from a memory such as a digital video recorder or a digital video disc, a webpage, audio and/or video presented (e.g., streamed) via the Internet, a video game, etc.) often involves collection of media identifying information (e.g., signature(s), fingerprint(s), code(s), tuned channel identification information, time of exposure information, etc.). Such audience measurement efforts typically also involve the collection of people data (e.g., user identifier(s), demographic data associated with audience member(s), etc.). The media identifying information and the people data can be combined to generate, for example, media exposure data indicative of amount(s) and/or type(s) of people that were exposed to specific piece(s) of media.

BRIEF DESCRIPTION OF THE DRAWINGS

FIG. 7 is an example data table storing data representing tagged media impressions that may be collected by the example audience measurement entity server of FIGS. 1-4 and/or 5.

FIG. 8 is an example data table that may be stored by the example audience measurement entity server of FIGS. 1-4 and/or 5 representing profiles generated for users that accessed tagged media.

Wherever possible, the same reference numbers will be used throughout the drawings) and accompanying written description to refer to the same or like parts.

DETAILED DESCRIPTION

Figure 1:
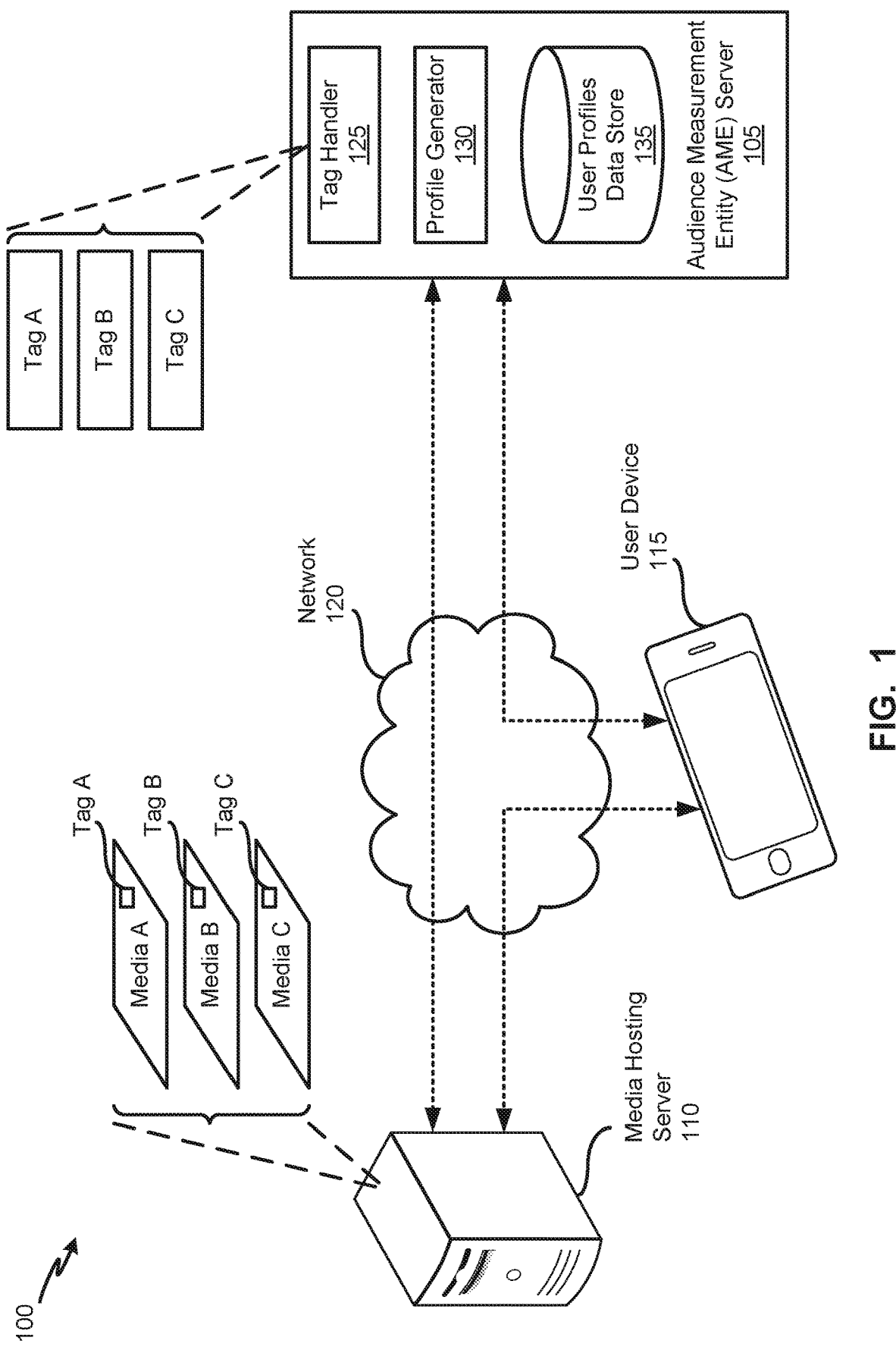
FIG. 1 is diagram of an example environment in which a system constructed in accordance with the teachings of this disclosure operates to associate geographic locations with mobile devices.

Media may be used to convey many different types of information. For example, a web page may include media (e.g., visual images, video, audio, text, etc.) and/or links (e.g., uniform resource locators (URLs)) to media available on the Internet. In some examples, media may be used to disseminate advertisements to a mass audience. For example, sponsored media is media that is served (e.g., on web pages) (or otherwise distributed) and advertises, endorses, or otherwise conveys a message in support of a product, a service, a company, etc. of a person or entity paying (or otherwise sponsoring) the media provider to serve the sponsored media.

Companies and/or individuals want to understand the reach and effectiveness of the media (e.g., content and/or advertisements) that they produce. For example, media that is associated with larger numbers of exposures and/or larger numbers of occurrences of an association may be considered more effective at influencing user behavior. Furthermore, companies and/or individuals want to understand the demographics (e.g., age, gender, geographic location, etc.) of users exposed to the media.

Monitoring impressions of advertisements, endorsements, or other media served to users is useful for generating impression statistics (e.g., reach and/or frequency) of the advertisements, endorsements, or other media. For example, measuring "reach" may be useful for estimating the number of unique (e.g., different) users who have been exposed to the media. Thus, an impression is representative of the fact that member(s) of a home or an individual having been exposed to media (e.g., an advertisement, content, a group of advertisements and/or a collection of content, etc.). With respect to online media, a quantity of impressions or impression count is the total number of times media (e.g., an advertisement, an advertisement campaign, a streaming program, etc.) has been presented to and/or accessed by a web population.

Monitoring entities (sometimes referred to as "monitoring companies" or "audience measurement entities") desire knowledge of how users interact with media and media devices such as smart phones, tablets, laptops, smart televisions, etc. In particular, media monitoring entities want to monitor media presentations made at the media devices to, among other things, monitor exposure to advertisements, determine advertisement effectiveness, determine user behavior, identify purchasing behavior associated with various demographics, etc.

However, not all exposures have the same value. For example, a proprietor of products and/or services that are only sold and/or available in Chicago may an advertisement for their products and/or services. In some such examples, an exposure to the advertisement by a user located in Miami is not as valuable to the proprietor as an exposure to the advertisement by a user located in Chicago. Examples disclosed herein facilitate serving relevant and meaningful media to users by associating the users with respective geographic locations.

Example methods, systems and apparatus disclosed herein may be used to collect monitoring information from a user device accessing tagged media, and then correlate a geographic location with the user device based on the monitoring information. Examples disclosed herein facilitate collecting monitoring information by tracking the monitoring information included in beacon(s) that are transmitted to the audience measurement entity in response to media request(s).

A user device (e.g., a mobile device), via a browser that renders media or a non-browser based application that presents media, requests the online media from a media provider (e.g., one or more content providers and/or advertising entities) by sending a request (e.g., a hypertext transfer protocol (HTTP) request and/or an HTTP secure (HTTPS) request) to an Internet address defined by a URL specified by the media provider. To enable monitoring of user access/ exposure to media, in some examples, participating publishers and/or web sites insert or embed a tag within the source (e.g., Hypertext Markup Language (HTML) code) of the web pages that they serve. The tag may include JavaScript, Flash and/or other executable instructions, which cause exposure to the media to be tracked (e.g., recorded by an audience measurement entity) when the tag executes on a requesting browser.

Methods, apparatus and systems for tagging media are described in, for example, U.S. Pat. No. 6,108,637, by Blumenau, entitled "Content Display Monitor," which is hereby incorporated by reference in its entirety. Because a tag is embedded in the media (e.g., HTML defining a web page and/or referenced by a pointer in the HTML of a web page), the tag is executed whenever a browser renders the corresponding media (e.g., the web page).

Typically, a tag will cause the browser to send a request (sometimes referred to herein as a "beacon") to a data collection facility such as an audience measurement entity server that is associated with the audience measurement entity. In some examples, the beacon is an HTTP request (e.g., an HTTP GET request, an HTTP POST request, etc.). The beacon enables monitoring data reflecting information about the media access to be tracked. To this end, the beacon carries identification information to be collected, compiled and/or analyzed at the audience measurement entity server. The identification information may include a user agent string to identify the user device on which the media is requested, a media identifier to identify the media with which the tag is associated (e.g., a website address), a host identifier to identify the host (e.g., web server) with which the requested media is associated (e.g., a vendor identifier (VID)) a time stamp to identify the dates/times at which the media is requested, accessed and/or received, one or more command identifiers identifying control commands (e.g., pause, play, stop, etc.) acted upon the media, etc.

Example methods, systems and apparatus disclosed herein leverage information from the beacon to select a location identifier that can be mapped to a geographic location. In some disclosed examples, the beacon includes a network address (e.g., an internet protocol (IP) address) that is assigned to a requesting (e.g., source) device (e.g., a user device). Disclosed examples identify the network address in the beacon and determine if the network address is a reliable (e.g., accurate) identifier of a geographic location based on a network connection used to transmit the beacon. For example, the user device may access the Internet via a fixed network such as a Wi-Fi connection or a mobile network such as a cellular network. As used herein, a fixed network is a wired and/or wireless network that operates in a fixed (or nearly fixed) location. A fixed network typically includes a router/switch that is connected to a cable modem on one end and connected to one or more device(s) on the other end. Example fixed networks include Wi-Fi networks used in houses and small businesses (e.g., coffee shops, libraries, etc.).

When the network address is determined to be a reliable location identifier (e.g., the beacon was transmitted via a fixed network), examples disclosed herein map the reliable location identifier (e.g., the network address) to a geographic location. Disclosed examples access a geographic database that includes a list of location identifiers (e.g., network addresses) to map the network addresses to a corresponding geographic location. The list may be as precise as determining a network address to the nearest city block or to a geographic region (e.g., Cook County, Ill.).

In some examples, when a beacon is transmitted via a mobile network (e.g., a cellular network), the beacon may be routed through a large geographic region before being received at the audience measurement entity. For example, a cellular network provider may route all traffic within their cellular network that originates in the Midwest (e.g., Dallas, Tex.) through a gateway located in Chicago, Ill. In some such examples, the network address in the beacon corresponds to the gateway (e.g., Chicago) rather than to the beacon origination location (e.g., the user device in Dallas). Thus, when the beacon is transmitted via a mobile network, the network address is determined to be a non-reliable location identifier.

When the network address is determined to be a non-reliable location identifier (e.g., the beacon was transmitted via a mobile network), examples disclosed herein attempt to identify location services information (e.g., Global Positioning System (GPS) coordinates) in the beacon. In some disclosed examples, when a beacon is transmitted via a mobile network, the provider of the mobile network (e.g., a cellular network provider) may embed location services information of the mobile device in the beacon. Disclosed examples access a geographic database that includes a list of location identifiers (e.g., GPS coordinates) to map the location services information to a corresponding geographic location.

In some disclosed examples, the mobile network provider may not embed location services information in the beacon. In some such examples, disclosed examples retrieve a user identifier from the beacon and query location services information from the mobile network provider based on the user identifier. Disclosed examples then access a geographic database that includes a list of location identifier (e.g., GPS coordinates) to map the location services information to a corresponding geographic location.

Some disclosed examples generate user profiles that associate a user and/or user device to a home location based on the identified geographic locations. For example, disclosed examples may tally the number of impressions for the one or more geographic location(s) associated with the same user and/or user device. In some such examples, when the number of impressions for a geographic location-user pairing satisfies a threshold, the corresponding geographic location is designated a home location for the user and/or user device.

In some disclosed examples, the generated profiles are provided to the media providers to facilitate providing location-based media to users requesting media. For example, in response to a media request, the media provider may use a user identifier extracted from the media request and query a database of profiles for a matching user identifier. In some such examples, when the user identifier in the request matches a user identifier in the database, media associated with the corresponding home location is provided to the requesting device. In some examples when a match is not found, disclosed examples provide general (e.g., national or location-agnostic) media.

FIG. 1 is an illustration of an example environment 100 in which examples disclosed herein may be implemented to associate user devices with respective geographic locations. The example environment 100 of FIG. 1 includes an audience measurement entity (AME) server 105, a media hosting server 110 and a user device 115. In some examples, the AME server 105 is implemented using multiple devices and/or the media hosting server 110 is implemented using multiple devices. For example, the AME server 105 and/or the media hosting server 110 may include disk arrays or multiple workstations (e.g., desktop computers, workstation servers, laptops, etc.) in communication with one another.

In the illustrated example, the AME server 105 is in selective communication with the media hosting server 110 and/or the user device 115 via one or more wired and/or wireless networks represented by network 120. Example network 120 may be implemented using any suitable wired and/or wireless network(s) including, for example, one or more data buses, one or more Local Area Networks (LANs), one or more wireless LANs, one or more cellular networks, the Internet, etc. In some examples, example network 120 may be implemented using two or more networks. For example, the user device 115 may be in communication with a network router via a private network (e.g., a fixed network such as a Wi-Fi network, a mobile network such as a cellular network, etc.), and the network router may be in communication with the AME server 105 and/or the media hosting server 110 via a public network such as the Internet. In some such examples, a message transmitted by the user device 115 is first communicated to the network router via the private network, and the message is then routed by the network router to the AME server 105 and/or the media hosting server 110 via the public network. As used herein, the phrase "in communication," including variations thereof encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIG. 1, an audience measurement entity (AME) operates and/or hosts the example AME server 105. The AME of the illustrated example is an entity that monitors and/or reports access to tagged media. For example, the AME may provide reports and/or user profiles identifying geographic location and user device pairings. The AME server 105 of the illustrated example is a server and/or database that collects and/or receives monitoring information related to tagged media (e.g., media having inserted or embedded executable instructions that causes the media view (e.g., an impression) to be recorded by, for example, the AME server 105). The AME of the illustrated example is a neutral entity that is not involved with the distributing of media.

In the illustrated example of FIG. 1, a media provider operates and/or hosts the media hosting server 110 that responds to requests for media that may include tags. For example, the media provider may engage the AME to collect and/or monitor information related to media associated with the media provider. Such a media provider may wish to use tagged media in a media campaign to determine and/or improve the effectiveness of the media campaign. In some examples, the information returned in response to the request for media includes an instruction (e.g., a tag) to inform the AME server 105 of the accessing of tagged media. In some examples, the information returned in response to the request for media includes a reference to a tag and/or executable monitoring instructions. For example, the tag and/or executable monitoring instructions (e.g., an applet) may be hosted at the AME server 105, which enables the AME to directly control the content of the tag and/or executable monitoring instructions. In some examples, the tag and/or executable monitoring instructions are hosted at the media hosting server 110.

By including a reference to a tag and/or executable monitoring instructions in the media, the content of the tag (e.g., executable monitoring instructions) may be changed at any time without modifying the media. For example, the tag and/or executable monitoring instructions may be updated to improve efficiency of collecting information for tagged media by updating the executable instructions hosted at the AME server 105 and/or the media hosting server 110. As shown above, the tag may reside wholly in the media or may be distributed between the media and the AME server 105 and/or the media hosting server 110. Tagged media may, thus, include an executable monitoring instruction that serves as a tag or a reference to monitoring instructions stored at an external location such as a server. In the latter case, the reference may be considered a first tag or a first portion of a tag and the external instruction may be considered a second tag or a second portion of a tag. In some examples, the media hosting server 110 is operated and/or hosted by a third party. In addition, for simplicity, only one media hosting server 110 is shown in FIG. 1, although multiple media hosting servers are likely to be present.

In the illustrated example of FIG. 1, the user device 115 is a smartphone (e.g., an Apple® iPhone®, a Motorola Moto X™, a Nexus 5, an Android™ platform device, etc.). However, any other type of device may additionally or alternatively be used such as, for example, a tablet (e.g., an Apple® iPad™, a Motorola™ Xoom™, etc.), a laptop computer, a desktop computer, a camera, an Internet compatible appliance, a smart TV, an Internet of Things-enabled device, etc. In the illustrated example, the user device 115 is used (e.g., by a user) to access (e.g., request, receive, render and/or present) online media that is tagged and returned by the media hosting server 110. For example, the user may execute a web browser on the user device 115 to request streaming media (e.g., via an HTTP request or an HTTPS request) from the media hosting server 110. In the illustrated example of FIG. 1, the user device 115 sends media monitoring information to the AME server 105 in response to accessing the tagged media.

As discussed above, a media provider may engage the AME to collect and/or monitor information related to media associated with the media provider. For example, the media provider may want to compare the performances of three distinct pieces of media (e.g., media A, B, C) to one another and/or to other media and/or to an expected or desired performance (e.g., reach and/or frequency) of the three pieces of media (e.g., media A, B C). In the illustrated example of FIG. 1, the AME server 105 includes an example tag handler 125 to facilitate tagging media A, B and C to enable the AME server 105 to track when and/or where media is requested by, for example, the user device 115. In the illustrated example, the tag handler 125 of FIG. 1 provides tags and/or references to tags to the media hosting server 110 for inserting into media. For example, the tag handler 125 may provide the media hosting server 110 an example tag A to include (e.g., insert, bed, etc.) in the media A, an example tag B to include in the media B, and an example tag C to include in the media. C. As discussed above, a tag may be a reference to monitoring instructions such that the reference, but not the instructions are embedded in the media. Alternatively, the tag may be the executable monitoring instructions (e.g., an applet) and may be located directly in the media and/or at an external location accessible to the media.

In the illustrated example, the tag handler 125 generates a tag that is later included in media hosted by the media hosting server 110. Based on the preferences of the media provider and or the AME, the tag handler 125 generates a tag that achieves the goals of the media provider and/or the AME. The tag handler 125 generates tags that enable the AME server 105 to collect and/or receive monitoring information related to the tagged media (e.g., media A, B and C). In some examples, the generated tags are then stored in a data structure such as a lookup table, and used by the tag handler 125 to facilitate tagging media.

In some examples, the tag handler 125 generates the tags (e.g., the tags A, B, C) and instructs the media hosting server 110 to include the tags (e.g., the tags A, B, C) into the corresponding media (e.g., media. A, B and C). In other examples, the tag handler 125 generates the tags (e.g., the tags A, B, C) and embeds the tags (e.g., the tags A, B, C) into the corresponding media (e.g., media A, B and C) and then provides the tagged media (e.g., the media A including tag A, the media B including tag B, the media C including tag C) to the media hosting server 110.

In some examples, the tag handler 125 generates the tags (e.g., the tags A, B, C) and instructs the media hosting server 110 to include references to the tags (e.g., the tags A, B, C) in the corresponding media (e.g., media A, B and C). For example, the media hosting server 110 may embed a tag A reference into the media A, a tag B reference into the media B, and a tag C reference into the media C. The tag references (A, B, C) may then be used to request the corresponding tag (e.g., the tag A, the tag B or the tag C). For example, when the media A including the tag A reference is accessed at the user device 115, the user device 115 may also send a request for the tag A using the tag A reference. In some such examples, the tag handler 125 generates the tags (e.g., the tags A, B, C) and the tag references (e.g., references to the tags A, B, C) and provides the tag references (e.g., references to the tags A, B, C) to the media hosting server 110 to insert into the corresponding media (e.g., media A, B, C) while the tag handler 125 stores the tags (e.g., the tags A, B, C). Thus, when the user device 115 accesses the media including the tag reference, the user device 115 uses the tag reference to request the corresponding tag from the tag handler 125.

In other examples, the tag handler 125 provides the tags (e.g., the tags A, B, C) and the tag references (e.g., references to the tags A, B, C) to the media hosting server 110. In some examples, the tag handler 125 generates the tags (e.g., the tags A, B, C) and provides to the media hosting server 110 the tags (e.g., the tags A, B, C) to include in the corresponding media (e.g., media A, B, C) and instructions to generate references to the tags (e.g., the tags A, B, C). For example, the media hosting server 110 may host the media to be tracked (e.g., media A, B, C), the tags (e.g., the tags A, B, C), generate references to the tags A, B, C, and embed the references A, B, C into the corresponding media (e.g., media A, B, C). In some examples, when the user device 115 accesses the media including the tag reference, the user device 115 requests the corresponding tag from the media hosting server 110. Thus, for example, when executable instructions of a tag need to be updated (e.g., replaced with executable instructions that improve efficiency in collecting media monitoring information), neither the media nor the reference to the tag included in the media needs to be modified. Rather, the tag handler 125 enables modifying only the tag on the server side (e.g., the instructions referenced by the tag included in the media).

As described above, some media served by the media hosting server 110 may be location-based or location-specific media. In some examples, in response to a media request from the user device 115, the example media hosting server 110 utilizes user-location mappings to determine a home location associated with the user and/or user device 115 and serves media specific to the home location. For example, the media hosting server 110 may compare user identifying information included in the media request from the user device 115 to the user-location mappings and determine a home location. In some examples, if the media hosting server 110 is unable to map the user identifying information to a home location, the example media hosting server 110 may serve general or location-agnostic media such as media included in a national campaign.

To enable mapping user identifying information to home locations, the example AME server 105 includes an example profile generator 130 and an example profiles data store 135. In the illustrated example of FIG. 1, the AME server 105 includes the example profile generator 130 to generate a profile for a user and/or user device associated with a geographic location. The example profile generator 130 of FIG. 1 parses impressions logged by the AME server 105 and identifies a geographic location, most likely a home geographic location, of a user of a user device (e.g., the user device 115 of FIG. 1). For example, the profile generator 130 parses the impressions, selects a user identifier, and tallies the respective number of impressions for the one or more geographic locations associated with the user identifier.

In the illustrated example, the profile generator 130 stores the profiles generated for respective user identifiers in the user profiles data store 135. An example data table 800 representing example data that may be stored in the example user profiles data store 135 is shown in the illustrated example of FIG. 8. The example user profiles data store 135 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example user profiles data store 135 may additionally or alternatively be implemented by one or more double data rate (DDR) memories, such as DDR, DDR2, DDR3, mobile DDR (mDDR), etc. The example user profiles data store 135 may additionally or alternatively be implemented by one or more mass storage devices such as hard disk drive(s), compact disk drive(s), digital versatile disk drive(s), etc. While in the illustrated example the user profiles data store 135 is illustrated as a single database, the user profiles data store 135 may be implemented by any number and/or type(s) of databases.

Figure 2:
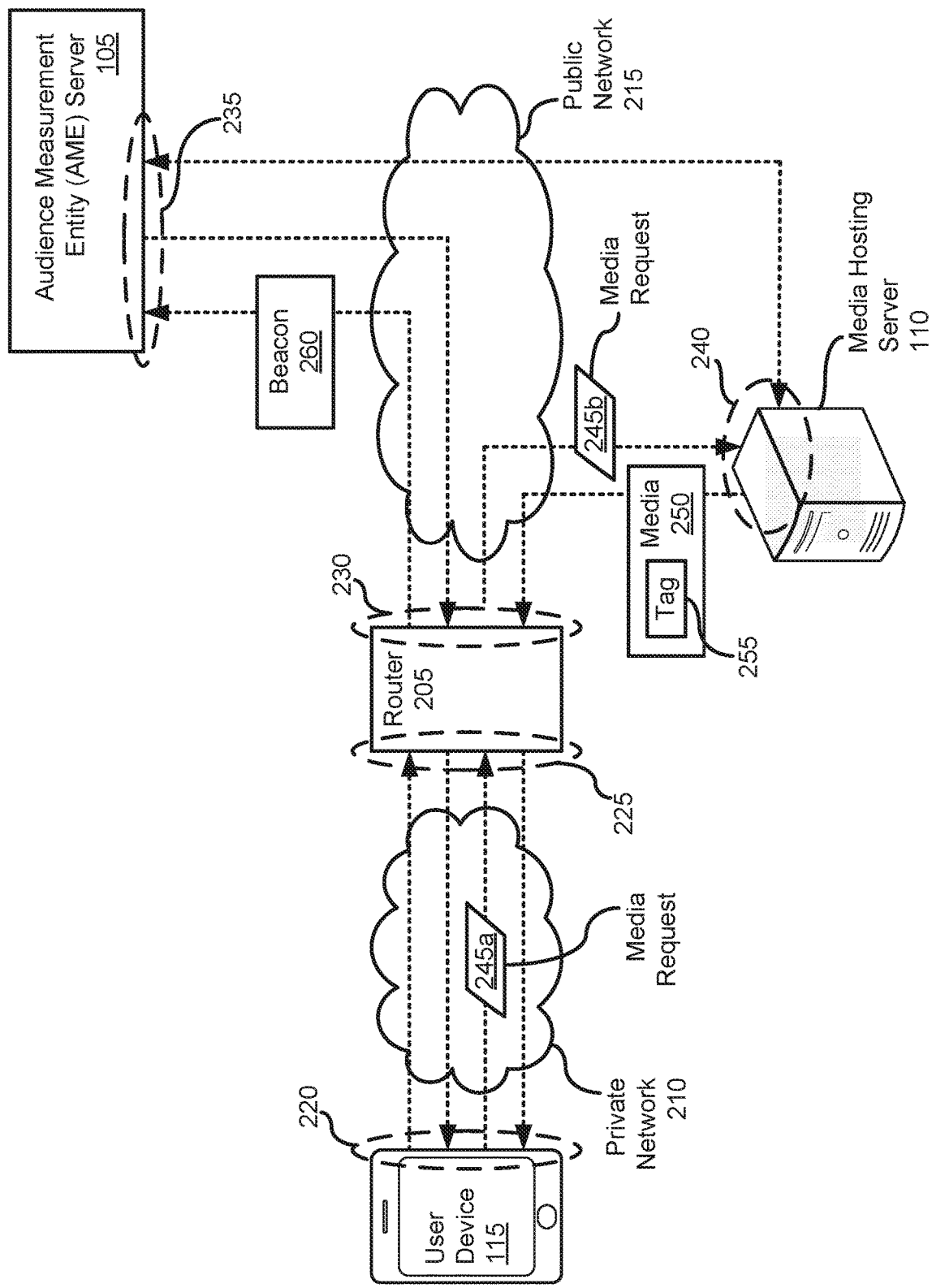
FIG. 2 is a diagram of an example message path illustrating metering of tagged media.

FIG. 2 is a diagram of an example message path illustrating metering of tagged media. In the illustrated example of FIG. 2, the user device 115 is in communication with the AME server 105 and/or the media hosting server 110 via a private network and a public network. For example, when the user device 115 sends a message (e.g., a request, a beacon, etc.) to the AME server 105 and/or the media hosting server 110, the message is first transmitted from the user device 115 to an example router 205 via an example private network 210. The example router 205 then transmits the message to the AME server 105 and/or the media hosting server 110 via an example public network 215 (e.g., the Internet). The example private network 210 may be implemented by a fixed network such as a Wi-Fi network and/or a mobile network such as a cellular network.

In the illustrated example of FIG. 2, the example user device 115 transmits a media request for media to the example media hosting server 110, for example, via a browser and/or a non-browser based application. Communication between two entities on the Internet is conducted in accordance with certain protocols (e.g., the Internet Protocol (IP) (e.g., IPv4 or IPv6), the Transmission Control Protocol (TCP), etc.). In accordance with TCP/IP, each device in a network (e.g., a private network and/or a public network) is assigned a network address (e.g., an IP address) at which the device can be accessed via the respective network. For example, for communications transmitted via the private network 210, the example user device 115 is assigned a first network address 220 and the example router 205 is assigned a second network address 225. In the illustrated example of FIG. 2, for communications transmitted via the public network 215, the router 205 is assigned a third network address 230, the example AME server 105 is assigned a fourth network address 235 and the example media hosting server 104 is assigned a fifth network address 240.

In the illustrated example, the router 205 is assigned two network addresses to communicate via the two networks to which it is connected. For example, the router 205 receives and/or transmits communications via the private network 210 at the example second network address 225. In the illustrated example, the router 205 receives and/or transmits communications via the public network 215 at the example third network address 230.

In addition, each message communicated in accordance with TCP/IP from a first device to a second device includes source identifying information (e.g., a network address associated with the first device), destination identifying information (e.g., a network address associated with the second device) and payload information corresponding to at least a portion of the message (e.g., the request for media, media monitoring information, etc.). In the illustrated example, the media request from the user device 115 to the media hosting server 110 is implemented as a first media request 245a from the user device 115 to the router 205 and a second media request 245b from the router 205 to the media hosting server 110. For example, the first media request 245a includes source identifying information (e.g., the first network address 220 associated with the user device 115), destination identifying information (e.g., the second network address 225 associated with the router 205) and payload information corresponding to at least a portion of the message (e.g., the request for media). In a similar manner, the example second media request 245b includes source identifying information (e.g., the third network address 230 associated with the router 205), destination identifying information (e.g., the fifth network address 240 associated with the media hosting server 110) and payload information corresponding to at least a portion of the message (e.g., the request for media).

In some examples, the media requests 245a, 245b include a user agent identifying characteristics of the user device 115 such as a browser identifier, a device identifier, etc. In some examples, the user agent information may be used to different between enterprise/business usage and consumer/residential usage. For example, certain user agents are known to be associated with mobile devices (e.g., a device identifier and/or a browser identifier associated with a smartphone or a tablet, etc.), while other user agents may be associated with user devices that are typically used in enterprises/businesses.

As described above in connection with FIG. 1, the media hosting server 110 of the illustrated example includes media (e.g., a website, an image, a video, etc.) that, when requested by the user device 115, causes the media hosting server 110 to respond with media 250. In the illustrated example of FIG. 2, the media 250 includes executable instructions such as an applet (e.g., an example tag 255) that, when executed by the user device 115, cause the user device 115 to send a communication (or beacon) including monitoring information to the AME server 105. The tag 255 may be included in the requested media in accordance with the teachings of Blumenau, U.S. Pat. No. 6,120,637. Accordingly, the user device 115 of the illustrated example of FIG. 2 transmits an example beacon 260 to the AME server 105 via the router 205.

In some such examples, the beacon 260 is a "dummy request" in that it is not actually intended to return data. Instead, the beacon 260 is used to carry monitoring information to the AME server 105. In some examples, the beacon 260 is implemented as an HTTP POST message, an HTTP GET message, or similar message used in present and/or future HTTP protocols.

The AME server 105 of the illustrated example records that a request (e.g., the beacon 260) was received from the router 205 and also records any data contained in the beacon 260 (e.g., source identifying information, destination identifying information and/or the payload information (e.g., media monitoring information)). The AME server 105, in some examples, responds to the request with an acknowledgement message. In some examples, the acknowledgement message requests and/or sets a cookie in the user device 115 to, for example, enable identification of subsequent beacons from the same user device. In some examples, the acknowledgement message requests and/or stores an AME generated user identifier at a local storage (e.g., web storage and/or Document Object Model (DOM) storage provided by, for example, HTML5) within, for example, a browser.

Figure 3:
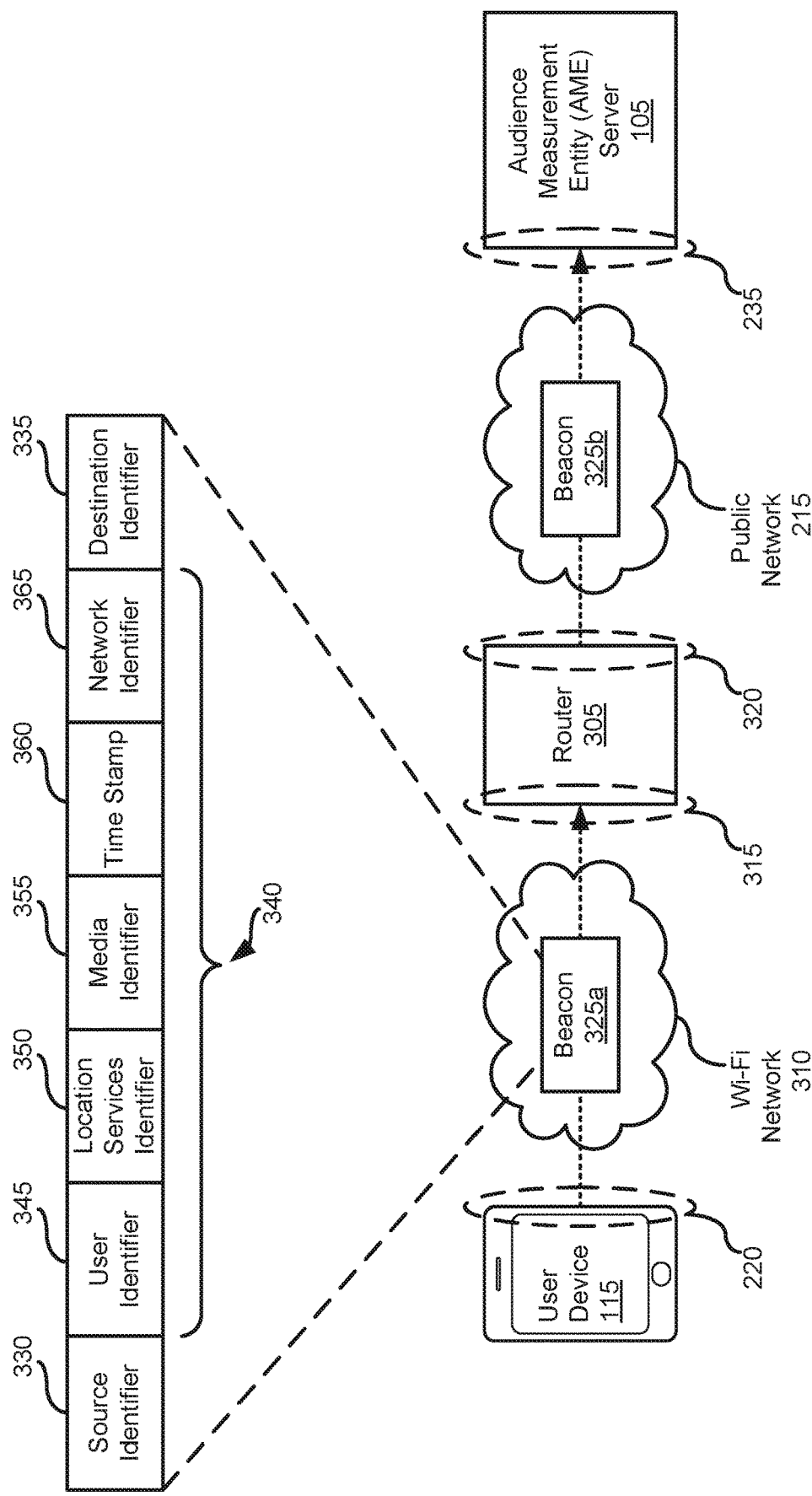
FIG. 3 is a diagram of an example message path illustrating metering of tagged media via a fixed-location network.

FIG. 3 is a diagram of an example message path illustrating a portion of the message path of FIG. 2. In the illustrated example of FIG. 3, the example message path illustrates a user device transmitting media monitoring information to an AME server via a fixed network and a public network. Specifically, the example message path of FIG. 3 includes the user device 115 (FIGS. 1 and/or 2) in communication with an example router 305 via a private network (e.g., the example private network 210 of FIG. 2). In the illustrated example, the private network between the user device 115 and the router 305 is implemented by an example Wi-Fi network 310. The example router 305 of FIG. 3 is in communication with the AME server 105 via the example public network 215 of FIG. 2 (e.g., the Internet). In some examples, router 305 is in communication with the public network 215 via an Internet Service Provider, which is typically a wired communication.

As described above, to communicate with other devices within their respective networks, the devices are assigned network addresses. For example, the user device 115 is assigned the first network address 220 to identify the user device 115 to devices accessing the Wi-Fi network 310 (e.g., the example router 305 or a proxy server).

Network routers connect one network to another network. Accordingly, network routers are assigned different network addresses within the different networks. In the illustrated example of FIG. 3, to access the router 305 within the network 310 (e.g., the user device 115), the router 305 is assigned a second network address 315. To access the router 305 within the public network 215 (e.g., the AME server 105 and/or the example media hosting server 110), the router 305 is assigned a third network address 320. The example AME server 105 of FIG. 3 is assigned the fourth example network address 235 to identify the AME server 105 to devices accessing the public network 215 (e.g., the example router 305 and/or the example media hosting server 110 of FIGS. 1 and/or 2).

In the illustrated example of FIG. 3, the user device 115 transmits media monitoring information to the AME server 105 (e.g., in response to the user device 115 presenting the tagged media 250 (FIG. 2) and executing the executable instructions of the example tag 255. More specifically, in response to executing the executable instructions (e.g., the tag 255), the user device 115 transmits an example beacon 325a to the router 305 via the Wi-Fi network 310. The example beacon 325a includes source identifying information 330 (e.g., the first example network address 220 associated with the user device 115), destination identifying information 335 (e.g., the second example network address 315 associated with the router 305) and payload information (e.g., media monitoring information 340). For example, the media monitoring information 340 of FIG. 3 includes user identifying information 345, location services information 350, media identifying information 355, a time stamp 360 and network identifying information 365.

In the illustrated example of FIG. 3, the user identifying information 345 is an alphanumeric string that uniquely identifies a user and/or the user device. For example, a user may sign-in to an application with a user identifier. The example user identifier is then associated with the activities of the user. For example, requests to the media hosting server 110 from the user device 115 and/or beacons transmitted to the AME server 105 may include the user identifier. The user identifier may include a handle, a screen name, a panelist identifier, a login or sign-on name, an email address, an advertising identifier (e.g., an iOS adID, an Android IDFA, etc.), etc. In some examples, the user identifying information 345 is an alphanumeric string that unique identifies the user device 115. For example, the user identifying information may include a Media Access Control (MAC) address, an international mobile equipment identity (MEI) number, a telephone number, an advertising identifier (e.g., an iOS adID, an Android IDFA, etc.), etc.

In the illustrated example of FIG. 3, the location services information 350 is location services data corresponding to a geographic location at which the user device 115 accessed the media 250. For example, the user device 115 may include a positioning system (e.g., implemented by a global positioning system (GPS)) to enable identification of the geographic location of the user device 115. In some such examples, when the user permits the user device 115 and/or an application to access the positioning system, the user device 115 and/or the application inserts data specifying the device location (e.g., GPS coordinates). In some examples, a user device may not include a positioning system and/or a geographic location information receiving interface and/or the application requesting the media (e.g., a browser) may not have access to the positioning system of the user device. In some such examples, the user device transmits the beacon 325a without location services information.

In the illustrated example of FIG. 3, the media identifying information 355 is data specifying the media. For example, the media identifying information 355 may include a filename, a universal resource locator (URL), a website address, a watermark, a signature, metadata, etc. In the illustrated example, the time stamp 360 corresponds to a date and/or time when the media was accessed (e.g., information specifying when the user was exposed to the media 250 and/or when the media 250 was received at the user device 115). In the illustrated example, the network identifying information 365 is an indicator of the type of network used by the user device 115 to transmit the beacon 325a. For example, the network identifying information 365 may indicate whether the beacon 325a was transmitted via a cellular network or a Wi-Fi network. In some examples, the network identifying information 365 indicates which network radio of the user device 115 was enabled. For example, the network identifying information 365 may indicate whether a Wi-Fi radio was enabled or a cellular radio was enabled. In some examples, the network identifying information 365 may identify additional information regarding the network such as the frequency, the band and/or the cellular radio type (e.g., 3G, 4G, LTE, etc.) used to transmit the beacon 325a.

The example router 305 of FIG. 3 then transmits a beacon 325b to the AME server 105 via the public network 215. In the illustrated example, the beacons 325a, 325b represent the same beacon at different points in time. The example beacon 325b includes the media monitoring information 340 included in the beacon 325a transmitted by the user device 115. However, in the illustrated example, the source identifying information 330 included in the user device-originated beacon 325a and the source identifying information 330 included in the router-originated beacon 325b are different. For example, the source identifying information 330 included in the device-originated beacon 325a identifies the first network address 220 associated with the user device 115. In contrast, the source identifying information 330 included in the router-originated beacon 325b identifies the third network address 320 associated with the router 305.

In some examples, the router 305 encrypts the information included in the beacon 325b prior to transmitting the beacon 325b to the AME server 105. The AME server 105 of the illustrated example records that a request (e.g., the beacon 325b) was received from the router 305 and also records any data contained in the beacon 325b (e.g., source identifying information 330, media monitoring information 345, a cookie, etc.). Accordingly, the AME server 105 of the illustrated example records the third network address 320 associated with the router 305 as the source of the beacon 325b.

Typically, the source identifying information (e.g., the network address) in a message is used to associate a geographic location with the user. For example, a database may map IP addresses to corresponding geographic locations. However, as described above, the source identifying information of the beacon may not represent the user device that originated the beacon. Instead, in some examples, the source identifying information may represent an intermediary device (e.g., the router 305 or a proxy server) that transmitted the beacon 325b to the AME server 105. Thus, the source identifying information 330 retrieved from the beacon is not always a reliable identifier of the geographic location of the user when accessing the media identified in the beacon.

In the illustrated example of FIG. 3, the AME server 105 parses the beacon 325b for location services information 350. In some such examples, the AME server 105 utilizes the location services information 350 retrieved from the beacon to identify a geographic location to associate with the user and/or the user device 115. For example, the AME server 105 may map GPS coordinates included in the beacon 325b to a geographic location.

In some examples, when the AME server 105 determines that the beacon 325b does not include location services information (e.g., does not include GPS coordinates), the AME server 105 parses the received beacon to determine whether the source identifying information is a reliable location identifier. For example, when a user device 115 transmits a beacon (e.g., the beacon 325a) via the Wi-Fi network 310, the location of the user device 115 and the router 305 are within the same general geographic area (e.g., the user device 115 is within 30 meters of the router 305 and/or a proxy server). For example, the AME server 105 may compare the source identifying information 330 to network addresses associated with Internet Service Providers (ISPs), cellular network providers, etc. In some examples, the AME server 105 may use network identifying information 365 included in the beacon 325b to determine the network connection used to transmit the beacon from the user device 115. In the illustrated example of FIG. 3, when the AME server 105 determines that the source identifying information 330 corresponds to communication via the Wi-Fi network 310, the location of the user device 115 can be assumed to be within the same general geographic area as the router 305. Accordingly, the AME server 105 utilizes the source identifying information of the router 305 (e.g., the third example network address 320) as an identifier of the geographic location of the user and/or the user device 115.

Figure 4:
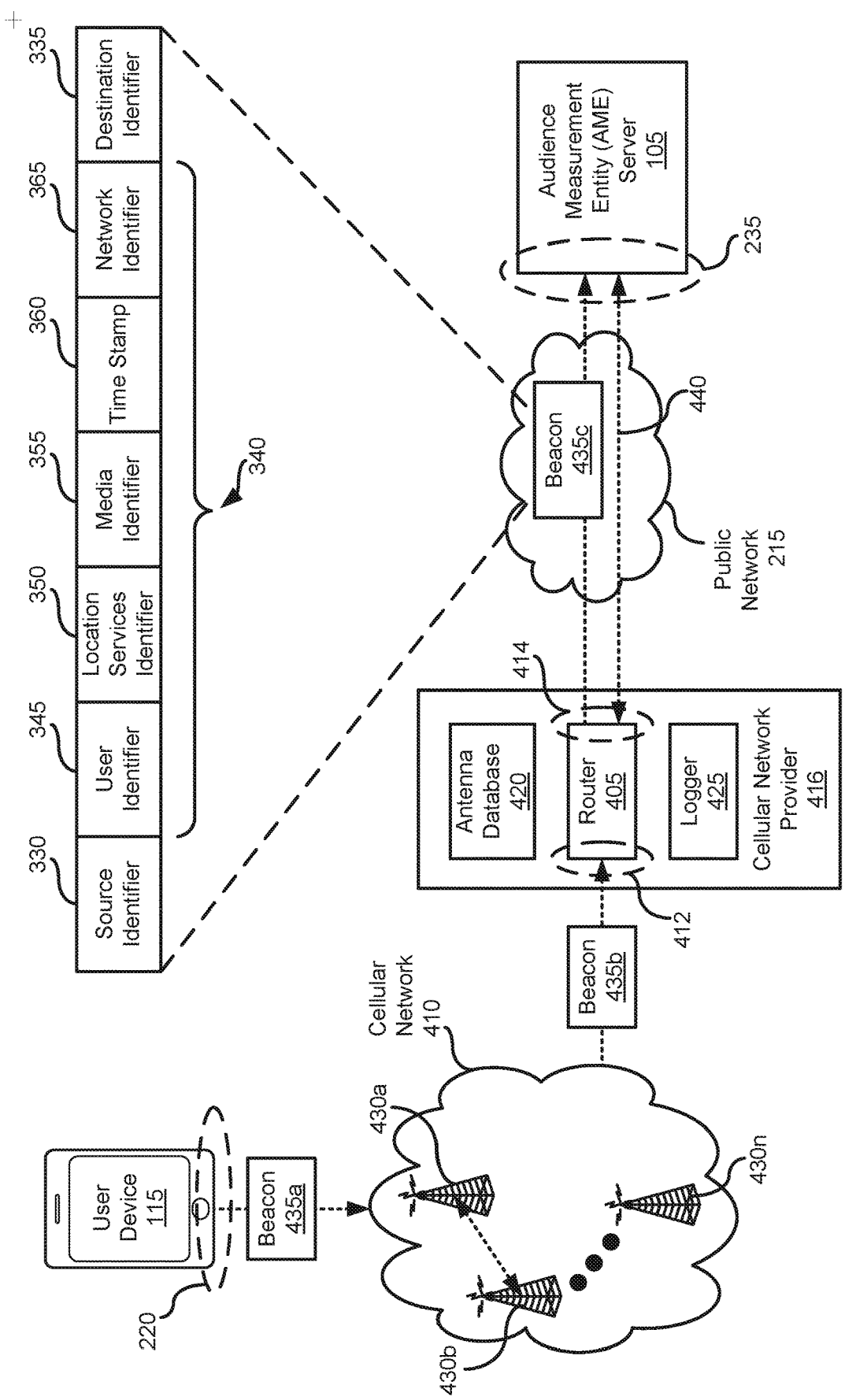
FIG. 4 is a diagram of an example message path illustrating metering of tagged media via a mobile network.

FIG. 4 is a diagram of another example message path illustrating a portion of the message path of FIG. 2. In the illustrated example of FIG. 4, the example message path illustrates a user device transmitting media monitoring information to an AME server via a mobile network and a public network. Specifically, the example message path of FIG. 4 includes the user device 115 (FIGS. 1 and/or 2) in communication with an example router 405 via a private network (e.g., the example private network 210 of FIG. 2). In the illustrated example of FIG. 4, the private network between the user device 115 and the router 405 is implemented by an example cellular network 410. To communicate via the cellular network 410, the example user device 115 is assigned the network address 220 (FIG. 2) and the router 405 is assigned a cellular network-network address 412. The example router 405 of FIG. 4 is in communication with the AME server 105 via the example public network 215 of FIG. 2 (e.g., the Internet). To communicate via the public network 215, the example router 405 is assigned a public network-network address 414 and the AME server 105 is assigned the network address 235 (FIG. 2).

In the illustrated example of FIG. 4, a cellular network provider 416 maintains the router 405 and provides the cellular network 410. The example cellular network provider 416 of FIG. 4 also maintains an example antenna database 420 and an example logger 425. The example cellular network provider 416 implements the cellular network 410 of FIG. 4 via example antennas 430. Messages communicated within the cellular network 410 are transmitted between one or more antennas 430 prior to being received at the router 405. For example, a first antenna 430a may receive a message from the user device 115 and forward the message to a second antenna 430b, which may then forward the message to another antenna 430 until an antenna 430n forwards the message to the router 405. In addition, each of the antennas 430 in the cellular network 410 are assigned a respective network address (e.g., a cellular network-network address) that may be used to access the respective antenna 430.

The example cellular network provider 416 maintains the example antenna database 420 to associate the antennas 430 with respective geographic locations. For example, the antenna database 420 may map an antenna identifier (e.g., a device identifier, a network address, etc.) of an antenna 430 to corresponding location services information (e.g., GPS coordinates provided by a positioning system). The example antenna database 420 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example antenna database 420 may additionally or alternatively be implemented by one or more double data rate (DDR) memories, such as DDR, DDR2, DDR3, mobile DDR (mDDR), etc. The example antenna database 420 may additionally or alternatively be implemented by one or more mass storage devices such as hard disk drive(s), compact disk drive(s), digital versatile disk drive(s), etc. While in the illustrated example the antenna database 420 is illustrated as a single database, the antenna database 420 may be implemented by any number and/or type(s) of databases.

The example logger 425 of FIG. 4 logs communications routed through the cellular network 410 in, for example, the antenna database 420. For example, the logger 425 may log the path taken by messages by recording an antenna identifier such as the network address of an antenna that receives a message, an antenna identifier of an antenna that forwards a message, a time tamp representing when the message was transmitted by and/or received at the respective antenna 430, etc. In the illustrated example, the logger 425 leverages knowledge of the cellular network 410 to associate location services information (e.g., GPS coordinates) with the respective antennas 430. For example, the logger 425 may query the antenna database 420 for GPS coordinates for an antenna using an identifier of the antenna. In some examples, the router 405 and/or the logger 425 may encrypt information included in messages prior to transmitting and/or forwarding the message.

In operation, in response to presenting requested media including a tag (e.g., the media 250 of FIG. 2 including the tag 255), the user device 115 executes the executable instructions (e.g., the corresponding tags), which causes the user device 115 to send media monitoring information to the AME server 105. In the illustrated example, in response to executing the executable instructions, the user device 115 transmits an example user device-originated beacon 435a via the cellular network 410. A first antenna 430a receives the user device-originated beacon 435a and forwards the media monitoring information 340 to a second antenna 430b, etc., until an antenna 430n forwards the media monitoring information 340 to the router 405. For example, the example antenna 430n may forward an antenna-originated beacon 435b including the media monitoring information 340 to the router 405. In the illustrated example, the example router 405 receives the antenna-originated beacon 435b from the antenna 430n in the cellular network 410 at the cellular network-network address 412 of the router 405. Additionally or alternatively, the first antenna 430a may forward the media monitoring information 340 to the router 405 via, for example, a land connection. In some examples, using a land connection to forward the media monitoring information 340 to the router 405 may be advantageous to the cellular network provider 416 in conserving the wireless capacity of their network.

The example logger 425 records the path taken by the beacon 435 from the user device 115 to the router 405 via one or more of the antenna(s) 430. For example, the logger 425 may record an antenna identifier associated with the first antenna that received the user device-originated beacon 435a, an antenna identifier associated with a second antenna that received forwarded information from the first antenna, etc., a time stamp identifying when the antenna-originated beacon 435b was received at the router 405, etc. In some examples, the logger 425 modifies the media monitoring information 340 included in the antenna-originated beacon 435b to include location services information. For example, the logger 425 may leverage the antenna-geographic location mappings included in the antenna database 420 and insert (e.g., embed) GPS coordinates associated with the first antenna 430a that received the user device-originated beacon 435a from the user device 115. In some such examples, the router-originated beacon 435c includes the location services information 350 provided by the logger 425. In some examples, the router 405 and/or the logger 425 encrypts the media monitoring information 340.

In the illustrated example of FIG. 4, the router 405 forwards the router-originated beacon 435c to the AME server 105 via the public network 215. The AME server 105 of the illustrated example records that a request (e.g., the router-originated beacon 435c) was received from the router 405 and also records any data contained in the router-originated beacon 435c (e.g., the source identifying information 330, the media monitoring information 340, etc.). As described above, the AME server 105 of the illustrated example records the source identifying information of the device (e.g., the router 405) that transmitted the router-originated beacon 435c to the AME server 105. Accordingly, the AME server 105 records the public network-network address 414 of the router 405.

In the illustrated example of FIG. 4, the beacons 435a, 435b, 435c are transmitting the same media monitoring information 340, but include different source identifying information 330 and destination identifying information 335. For example, the user device-originated beacon 435a includes source identifying information corresponding to the network address 220 of the user device 115 and destination identifying information corresponding to the first antenna 430a in the cellular network 410. The example antenna-originated beacon 435b includes source identifying information corresponding to a network address of the antenna 430n and destination identifying information corresponding to the cellular network-network address 412 of the router 405. The example router-originated beacon 435c includes source identifying information corresponding to the public network-network address 414 of the router and destination identifying information corresponding to the network address 235 of the AME server 105. In the illustrated example, the media monitoring information 340 correspond to the media (e.g., the media 250) accessed at the user device 115. In some examples, the media monitoring information 340 received at the AME server 105 may additionally or alternatively include location services information provided by the logger 425.

In the illustrated example, when a cellular network is used to transmit a beacon, the location of the user device and the router may be or may not be within the same general area and, thus, the source identifying information retrieved by the AME server from the beacon 435 may not be a reliable identifier of the geographic location of the user of the user device. For example, consider an example in which the cellular network provider 416 operates in the Midwest and directs all traffic within the cellular network 410 to the router 405, which is located in Chicago, Ill. In some such examples, the media monitoring information 340 may originate in, for example, Dallas, Tex., and be routed through a series of antennas 430 before finally being received by the router 405 in Chicago. Accordingly, the geographic location of the router 405 (e.g., Chicago, Ill.) is not a reliable identifier of the geographic location of the user of the user device 115 (e.g., Dallas, Tex.).

In the illustrated example of FIG. 4, the AME server 105 parses the router-originated beacon 435c to determine whether the source identifying information is a reliable location identifier. As described above, the AME server 105 parses the router-originated beacon 435c for location services information. For example, the user device 115 may include a positioning system (e.g., implemented by a global positioning system (GPS)) to enable identification of the geographic location of the user device 115. In some such examples, when the user permits the user device 115 and/or an application to access the positioning system, the user device 115 and/or the application inserts data specifying the device location (e.g., GPS coordinates). In the illustrated example, when the AME server 105 determines that the router-originated beacon 435c does not include location services information, the example AMR server 105 determines whether the source identifying information is a reliable location identifier based on the network connection type used by the user device 115 to communicate the media monitoring information 340.

Additionally or alternatively, the cellular network provider 416 may insert location services information in the router-originated beacon 435c transmitted to the AME server 105. For example, the logger 425 may insert (e.g., in the router-originated beacon 435c) GPS coordinates associated with the first antenna 430a that received the user device-originated beacon 435a. In the illustrated example, in order for the user device 115 to connect with the first antenna 430a, the user device 115 and the first antenna 430a are assumed to be in the same general area. In some such examples, the AME server 105 utilizes the location services information retrieved from the router-originated beacon 435c to identify a geographic location to associate with the user and/or the user device 115. However, if a user device does not include a positioning system and/or a geographic location information receiving interface and/or the application requesting the media (e.g., a browser) does not have access to the positioning system of the user device and/or the logger 425 does not insert location services information, the router-originated beacon 435c is received by the AME server 105 without location services information.

In some examples, the AME server 105 may determine that the source identifying information 330 is an unreliable location identifier (e.g., the beacon was transmitted via the cellular network 410) and that the received router-originated beacon 435c does not include location services information 350. In some such examples, the AME server 105 requests location services information from the cellular network provider 416. For example, the AME server 105 may send a request 440 querying the cellular network provider 416 using the user identifying information 345 and/or the time stamp 360 extracted from the router-originated beacon 435c. In some such examples, the logger 425 receives the request 440 for location services information and returns location services information retrieved from the antenna database 420 based on the user identifying information 345 and/or the time stamp 360. For example, the logger 425 may identify a recorded message path based on the user identifying information 345 and/or the time stamp 360. In some such examples, the logger 425 may map the identified message path to the first antenna 430a that received the corresponding user device-originated beacon 435a and query the antenna database 420 for location services information (e.g., GPS coordinates) for the corresponding antenna 430.

Figure 5:
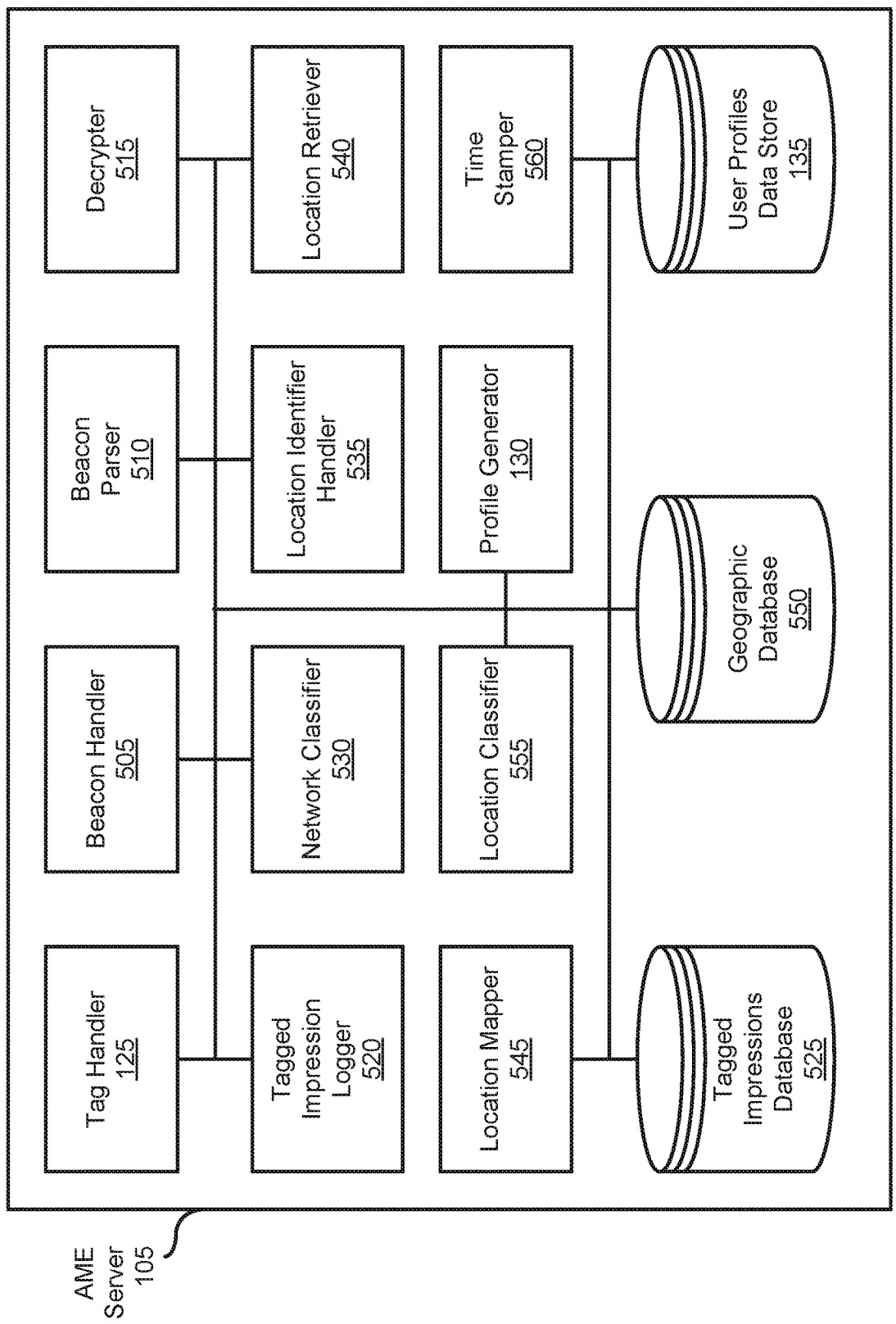
FIG. 5 is a block diagram of an example implementation of the audience measurement entity of FIGS. 1-3 and/or 4 that may facilitate associating geographic locations with mobile devices.

FIG. 5 is a block diagram of an example implementation of the AME server 105 of FIGS. 1-3 and/or 4. The example AME server 105 of the illustrated example includes the example tag handler 125, the example profile generator 130, the example user profiles data store 135, an example beacon handler 505, an example beacon parser 510, an example decrypter 515, an example tagged impression logger 520, an example tagged impressions database 525, an example network classifier 530, an example location identifier handler 535, an example location retriever 540, an example location mapper 545, an example geographic database 550, an example location classifier 555 and an example time stamper 560. As discussed above, the AME server 105 includes the example tag handler 125 to facilitate tagging media. For example, the tag handler 125 may instruct the media hosting server 110 to insert the tag 255 (which may be a reference to an external tag) into the media 250. For example, the tag handler 125 may provide the media hosting server 110 executable instructions (e.g., the tag 255, an applet, etc.) to embed into the media 250. In some examples, the tag handler 125 instructs the media hosting server 110 to insert a reference to the tag 255 into the media 250 and the tag 255 is hosted outside the media. In some such examples, when the user device 115 accesses the media 250, the user device 115 also sends a request for the tag 255 using the reference. In the illustrated example, when the tag handler 125 instructs the media hosting server 110 to insert a reference to the tag 255, the tag 255 may be hosted at the media hosting server 110 and/or at the AME server 105.

In the illustrated example of FIG. 5, the AME server 105 includes the example beacon handler 505 to facilitate communication with user devices (e.g., the user device 115 of FIGS. 1-3 and/or 4). For example, the beacon handler 505 may receive dummy requests from the user device 115 executing the executable instructions (e.g., the tag 255). In some examples, the beacon handler 505 sends an acknowledgement response to the user device 115 in response to receiving the dummy request. In other examples, the beacon handler 505 provides no response.

In the illustrated example of FIG. 5, the AME server 105 includes the example beacon parser 510 to extract information (e.g., the source identifying information 330, the media monitoring information 340, etc.) included in a received beacon (e.g., the example beacon 325b of FIG. 3, the example beacon 435c of FIG. 4 and/or, more generally, the example beacon 260 of FIG. 2). For example, the beacon parser 510 may identify the location services information 350 of FIGS. 3 and/or 4 included in the media monitoring information 340. In some examples, the beacon parser 510 may identify a user agent and/or a beacon header identifying an application and/or the user device 115. For example, the user agent may include a media access control (MAC) address, an international mobile equipment identity (IMEI) number, a telephone number, etc. associated with the user device 115 (e.g., the user identifying information 345 of FIGS. 3 and/or 4).

In some examples, the beacon parser 510 may identify a media identifier identifying the media that was accessed at the user device 115 (e.g., the media identifying information 355 of FIGS. 3 and/or 4)). In some examples, the beacon parser 510 may identify and/or set a cookie enabling identification of subsequent beacons from the same user device. In some examples, the beacon parser 510 may be unable to identify location services information 350 in the beacon 260. For example, when the media monitoring information 340 is sent from a user device that does not include a positioning system and/or does not have access to a positioning system, the beacon 260 will not have the location services information 350. In addition, the beacon 260 may not include the location services information 350 when the media monitoring information 340 is communicated from the user device 115 to the AME server 105 via a mobile network (e.g., the example cellular network 410 of FIG. 4) that does not modify the media monitoring information 340 to include location services information.

In some examples, the beacon parser 510 may parse the beacon 260 and identify an additional IP address. For example, the HTTP/HTTPS protocol supports the use of an additional IP address in the HTTP header (sometimes referred to as an X-Forwarded-For header field). In some instances, the IP address included in the X-Forwarded-For header field may represent a relatively more accurate indication of the source location of the user device 115 that communicated the beacon 260. In some such instances, when the beacon parser 510 identifies an IP address in the X-Forwarded-For header field of the beacon 260, the example beacon parser 510 identifies the X-Forwarded-For IP address as the location services information 350.

In the illustrated example of FIG. 5, the AME server 105 includes the example decryptor 515 to decrypt information in the received beacon 260. For example, information included in the beacon 260 may be encrypted. For example, the executable tag 255 may cause the user device 115 to encrypt the location services information 350 and/or the media monitoring information 340 prior to including the location services information 350 in the media monitoring information 340. In other examples, the routers 305, 405 of FIGS. 3 and 4, respectively (and/or, more generally, the example router 205 of FIG. 2) and/or the example logger 425 of FIG. 4 may encrypt the location services information 350 and/or the media monitoring information 340 prior to communicating the media monitoring information 340 to the AME server 105. In this manner, personal data such as precise location data that may identify where a user is accessing media is protected. In some such examples, the decrypter 515 may be used to decrypt the information included in the beacon 260 prior to the beacon parser 510 parsing the beacon 260.

In the illustrated example of FIG. 5, the AME server 105 includes the example tagged impression logger 520 to credit (or log) impressions to media based on the media monitoring information 340 included in the beacon 260. For example, the tagged impression logger 520 may list the corresponding media (e.g., via one or more media identifiers) in a data structure. In some examples, the tagged impression logger 520 appends and/or prepends additional information crediting the identified media with an exposure. For example, the tagged impression logger 520 may identify a media source from which the media was received (e.g., a vendor identifier, a URL, etc.), a network address of the source and/or an identifier of the user device 115 (e.g., an international mobile equipment identity (IMEI) number, a cookie, a MAC address, etc.). In addition, the tagged impression logger 520 may append a time stamp from the example time stamper 560 indicating the date and/or time when the beacon 260 was received by the AME server 105. This time stamp may be in addition to a time stamp applied at the user device 115 to identify the media access time (e.g., the time stamp 360 of FIGS. 3 and/or 4).

In the illustrated example, the tagged impression logger 520 stores the tagged impressions for media in the tagged impressions database 525. An example data table 700 representing tagged impressions is shown in the illustrated example of FIG. 7. The example tagged impressions database 525 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example tagged impressions database 525 may additionally or alternatively be implemented by one or more double data rate (DDR) memories, such as DDR, DDR2, DDR3, mobile DDR (mDDR), etc. The example tagged impressions database 525 may additionally or alternatively be implemented by one or more mass storage devices such as hard disk drive(s), compact disk drive(s), digital versatile disk drive(s), etc. While in the illustrated example the tagged impressions database 525 is illustrated as a single database, the tagged impressions database 525 may be implemented by any number and/or type(s) of databases.

In the illustrated example of FIG. 5, the AME server 105 includes the example network classifier 530 to classify the network connection used by the user device 115 to transmit the media monitoring information 340 to the AME server 105. For example, the network classifier 530 may classify the network as a Wi-Fi network or a cellular network. In some examples, the network classifier 530 classifies the network connection based on a flag (e.g., network identifying information 365 of FIGS. 3 and/or 4) included in the media monitoring information 340. For example, when the user device 115 generates the media monitoring information 340, the user device 115 may determine whether a cellular radio of the user device 115 is being used to transmit the media monitoring information 340 or a Wi-Fi radio of the user device 115 is being used to transmit the media monitoring information 340. In some such examples, the user device 115 may include network identifying information 365 (e.g., a flag value set to true, cellular, etc.) indicating the network connection-type is a cellular network when the cellular radio is enabled and/or network identifying information 365 (e.g., a flag set to false, Wi-Fi, etc.) indicating the network connection-type is a Wi-Fi network when the Wi-Fi radio is enabled.

In some examples, the network classifier 530 classifies the network connection-type based on source identifying information. For example, the network classifier 530 may compare the source identifying information 330 including in the beacon 260 to a data structure of known network address-service provider pairings. For example, when the source identifying information (e.g., a network address) is associated with an Internet service provider, the network classifier 530 may classify the network connection used to transmit the media monitoring information 340 as a Wi-Fi network. In some examples, when the source identifying information is associated with a cellular network provider, the network classifier 530 may classify the network connection used to transmit the media monitoring information 340 as a cellular network.

In the illustrated example of FIG. 5, the AME server 105 includes the example location identifier handler 535 to determine a location identifier to use to accurately determine the geographic location of the user device 115. As described above, a location identifier corresponds to a geographic location. In the illustrated example, the AME server 105 uses the location identifier to associate user devices with respective geographic locations. In the illustrated example, the location identifier handler 535 records the selected location identifier with the corresponding tagged impression in the tagged impressions database 525. In some examples, the location identifier handler 535 alters and/or obfuscates the location identifier prior to recording the location identifier in the tagged impressions database 525. For example, the location identifier handler 535 may decrease the resolution of the location identifier, for example, to comply with personal identification information regulations.

The location identifier handler 535 of the illustrated example of FIG. 5 determines whether to select the source identifying information 330 of the beacon 260 or to select location services information 350 included in the media monitoring information 340 as the location identifier. In some examples, the location identifier handler 535 makes the determination based on the presence of the location services information 350. For example, the location services information 350 may include a flag indicating that the application requesting the media (e.g., a browser) had access to the positioning system of the user device 115. In some such examples, because the user device 115 had access to a positioning system and the location services information 350 is indicative of the geographic location of the user device 115, the example location identifier handler 535 uses the location services information 350 as the location identifier. In other examples, for example, when the application requesting the media (e.g., a browser) did not have access to the positioning system of the user device 115, but the beacon media monitoring information 340 includes location services information, the network classifier 530 classifies the network connection-type used by the user device 115 to transmit the media monitoring information 340 as a cellular network.

In the illustrated example of FIG. 5, when the location identifier handler 535 determines that the application requesting the media (e.g., a browser) did not have access to the positioning system of the user device 115, the location identifier handler 535 determines the location identifier to select based on the network classification (e.g., a Wi-Fi network and/or a cellular network) of the network used to transmit the media monitoring information 340 to the AME server 105, as determined by the network classifier 530. For example, when the network classifier 530 classifies the network connection-type a fixed-location network (e.g., the example Wi-Fi network 310 of FIG. 3), the example location identifier handler 535 of FIG. 5 elects to use the source identifying information 330 of the beacon 260 as the location identifier and. For example, the router used in a Wi-Fi network is typically located at a fixed address. In addition, due to the limited range of a Wi-Fi network, the user device 115 and the router 205 are typically in the same general geographic area (e.g., within a residence, within a small business, etc.). Thus, the source identifying information 330 of the router (e.g., the Wi-Fi network-network address 315 of the router 305 of FIG. 3 and/or a proxy server) is a reliable (e.g., accurate) identifier of the geographic location of the user and/or the user device 115. However, as described below, in instances where the Wi-Fi network is associated with a business location, the source identifying information 330 of the router is determined to not be a reliable identifier of the geographic location of the user and/or the user device 115.

In some examples, when the media monitoring information 340 is transmitted by the user device 115 via a mobile network (e.g., the example cellular network 410 of FIG. 4), the provider of the mobile network may modify the media monitoring information 340 to include location services information 350. For example, the example logger 425 of FIG. 4 may insert (or embed) GPS coordinates corresponding to the antenna (e.g., the example antenna 430a) that the user device 115 is in connection with. In some such examples, the location identifier handler 535 selects the location services information 350 from the media monitoring information 340 as the location identifier.

In some examples, the provider of the mobile network may not modify the media monitoring information 340 to include location services information 350. In some such examples, the media monitoring information 340 does not include location services information 350 (e.g., GPS coordinates). However, the example location identifier handler 535 of FIG. 5 may determine that the network connection-type used by the user device 115 to transmit the media monitoring information 340 was not a fixed-location network (e.g., as provided by the network classifier 530). In some such examples, the location identifier handler 535 determines that the source identifying information 330 of the beacon 260 is not a reliable (e.g., accurate) identifier of the geographic location of the user and/or the user device 115. In some such examples, the location identifier handler 535 records the location identifier for the corresponding impression entry as unknown (e.g., not available (N/A), null, etc.).

In the illustrated example of FIG. 5, the AME server 105 includes the example location retriever 540 to retrieve location services information for impression entries with unknown location identifiers. The example location retriever 540 of the illustrated example of FIG. 5 generates a query (or queries) to be transmitted to the provider of the mobile network used by the user device 115 to transmit the beacon 260. In the illustrated example, the location retriever 540 reads the impression entries from the tagged impressions database 525 to identify the impression entries with unknown location identifiers and generates a query (or queries) requesting location services information (e.g., GPS coordinates) for some or all impression entries with an unknown location identifier in the tagged impressions database 525. For example, the location retriever 540 may generate a query including user identifying information 345 and/or a time stamp of when the beacon 260 was received at the ANTE server 105 and/or the time stamp 360 indicating when the user device 115 transmitted the media monitoring information 340.

In examples disclosed herein, the example location retriever 540 generates queries to be transmitted at periodic intervals (e.g., every 24 hours, every Monday, etc.). However, any other time period may additionally or alternatively be used for preparing queries. For example, the location retriever 540 may generate queries at aperiodic intervals (e.g., when requested) and/or as a one-time event. Additionally or alternatively, instead of generating queries as they are to be transmitted, the example location retriever 540 may generate queries ahead of time and cache the pre-generated queries.

The example location retriever 540 of the illustrated example of FIG. 5 transmits the queries to the cellular network provider 416 (e.g., to the logger 425 of FIG. 4). In the illustrated example, the queries are transmitted via the public network 215 as the results of those queries are needed for analysis (e.g., at the end of a time period). However, the queries and their associated results may be transmitted in any other fashion. Additionally or alternatively, the queries may be transmitted to the logger 425 ahead of time, and results (e.g., location services information corresponding to the provided user identifying information 345 and/or time stamp information) may be returned upon expiration of the time period. Its response to the query, the example location retriever 540 receives information associated therewith relevant to the particular impression of interest (e.g., location services information (e.g., GPS coordinates) associated with the antenna 430 with which the user device 115 was in connection.

In the illustrated example of FIG. 5, the AME server 105 includes the example location mapper 545 to map a location identifier to a corresponding geographic location. In the illustrated example of FIG. 5, the location mapper 545 accesses a geographic database 550 that maps a list of location identifiers to their corresponding geographic locations. For example, the location mapper 545 may match the location identifier (e.g., source identifying information 330 such as a network address and/or location services information 350) to a geographic location. In some examples, the geographic database 550 may include a first data structure that maps source identifying information-to-geographic locations and include a second data structure that maps location services information-to-geographic locations. The mappings may be as precise as determining a location identifier (e.g., source identifying information or location services information) to the nearest city block or to a geographic region (e.g., Cook County, Ill.). In some examples, the location mapper 545 may find the exact location identifier in the geographic database 550 or, alternatively, by matching a portion of the location identifier within the geographic database 550. For example, the location mapper 545 may match a prefix of the network address to a prefix and/or a network address range within the geographic database 550.

In the illustrated example, when the location mapper 545 matches the location identifier of the impression to a location identifier and/or portion of a location identifier in the geographic database 550, the location mapper 545 associates the corresponding geographic location to the user identifier and/or the tagged impression entry. The associated geographic location may include a county, a state, a region, a city, a town, a zip code and/or a block. The resolution of the geographic location may depend on the specificity of geographic location information in the geographic database 550. In some examples, the resolution of the geographic location may depend on privacy protection protocols and/or legal regulations. For example, a privacy protection protocol may define an acceptable geographic region to be at least one square mile in area. In some such examples, the associated geographic location in the geographic database 550 may include geographic locations that are at least one square mile in area, and the user of the user device 115 could be anywhere within that one square mile of area.

The example geographic database 550 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example geographic database 550 may additionally or alternatively be implemented by one or more double data rate (DDR) memories, such as DDR, DDR2, DDR3, mobile DDR (mDDR), etc. The example geographic database 550 may additionally or alternatively be implemented by one or more mass storage devices such as hard disk drive(s), compact disk drive(s), digital versatile disk drive(s), etc. While in the illustrated example the geographic database 550 is illustrated as a single database, the geographic database 550 may be implemented by any number and/or type(s) of databases.

In the illustrated example of FIG. 5, the AME server 105 includes the example location classifier 555 to parse the impressions in the tagged impressions database 525 and to classify the impressions that likely correspond to a business location rather than, for example, a residential location. In the illustrated example, the location classifier 555 parses the source identifying information 330 and tallies the number of impressions associated with the same source identifying information. When the number of impressions associated with the same source identifying information satisfies a business threshold, the corresponding source identifying information is likely associated with a business. For example, when the number of impressions associated with a first network address is equal to and/or greater than the business threshold (e.g., 10 impressions), then the location classifier 555 classifies the first network address as a business location.

In some examples, the location classifier 555 uses timestamps associated with the impressions when determining whether the source identifying information is likely associated with a business location. For example, impressions that are received during business hours may indicate that source identifying information corresponding to business-hour impressions are likely business locations. Additionally or alternatively, impressions that are received during early morning or late evening may indicate that the corresponding source identifying information is likely a residence/home location.

In some examples, the location classifier 555 processes the impressions associated with a fixed-location network connection to identify the source identifying information 330 likely associated with a business rather than a residence. For example, the intranet traffic of a corporate office located in Atlanta, Ga. may be routed to a router at the corporate headquarters located in New York City, N.Y. In some such examples, user devices that transmit media monitoring information 340 through the corporate intranet (e.g., a Wi-Fi network) are received at the AME server 105 from the same source address (e.g., the source identifying information associated with the router located in New York City). In the illustrated example, if the number of impressions associated with the source identifying information of the New York City router satisfies (e.g., is greater than or equal to) a business threshold, the example location classifier 555 classifies the corresponding impressions as associated with businesses. The example location classifier 555 then records that the corresponding impressions are associated with a business location in the tagged impressions database 525.

In some examples, the locations classifier 555 may be pre-populated with location classifications based on known IP addresses. For example, IP addresses may be collected from panelists with known locations (e.g., at their home or at a business). In some such examples, when source identifying information corresponds to a known IP address, the corresponding location (e.g., residence or business location) can be applied to the impression.

Additionally or alternatively, in some examples, the locations classifier 555 may learn location classification thresholds over time. For example, in addition to source identifying information, the locations classifier 555 may also receive an indication whether the source identification information corresponds to a business location or a residential location. In some such examples, a tally for the corresponding location is recorded for corresponding source identifying information. Thus, after iterations of receiving source identifying information and location classifications, the locations classifier 555 "learns" the likelihood (or probability) that particular source identifying information (e.g., an IP address) corresponds to a business location or a residential location. However, any other technique for "teaching" the locations classifier 555 location classifications may additionally or alternatively be used.

In the illustrated example of FIG. 5, the AME server 105 includes the example profile generator 130 to generate a profile for a user and/or user device associated with a geographic location. The example profile generator 130 of FIGS. 1 and/or 5 parses the impressions in the tagged impressions database 525 and identifies a geographic location mostly likely a home geographic location of a user and/or a user device 115. For example, the profile generator 130 parses the impressions in the tagged impressions database 525, selects a user identifier, and tallies the respective number of impressions for the one or more geographic locations associated with the user identifier. When the number of impressions associated with the same user identifier and geographic location satisfies a residence threshold, the corresponding geographic location is associated with the home location of the user and/or the user device 115. However, other techniques for identifying a home location to associate with the user and/or the user device 115 may additionally or alternatively be used. For example, certain user agents are typically associated with consumer-grade user devices (e.g., personal computers, laptops, etc.), while other user agents are typically associated with enterprise/business devices. In such instances, the profile generator 130 may tally the number of impressions for the one or more user agents associated with consumer devices. In the illustrated example of FIG. 5, the example profile generator 130 does not include the impressions marked as business locations, for example, by the location classifier 555, when generating profiles.

In some examples, the profiles generated by the example profile generator 130 include demographic information of the user such as the age, gender, presence of children, income, ethnicity, etc. For example, the profile generator 130 may access a demographics database that includes demographic information in association with a user identifier. The example profile generator 130 may combine the demographic information retrieved from the demographics database when generating the profile.

In the illustrated example, the profile generator 130 stores the profiles generated for respective user identifiers in the user profiles data store 135. An example data table 800 representing example data that may be stored in the example user profiles data store 135 is shown in the illustrated example of FIG. 8. The example user profiles data store 135 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example user profiles data store 135 may additionally or alternatively be implemented by one or more double data rate (DDR) memories, such as DDR, DDR2, DDR3, mobile DDR (mDDR), etc. The example user profiles data store 135 may additionally or alternatively be implemented by one or more mass storage devices such as hard disk drive(s), compact disk drive(s), digital versatile disk drive(s), etc. While in the illustrated example the user profiles data store 135 is illustrated as a single database, the user profiles data store 135 may be implemented by any number and/or type(s) of databases.

The example time stamper 560 of FIG. 5 includes a clock and a calendar. The example time stamper 560 associates a time period (e.g., 1:00 a.m. UTC (Coordinated Universal Time) to 1:01 a.m. (UTC)) and a date (e.g., Jan. 1, 2015) with each generated tagged impression entry from the tagged impression logger 520 by, for example, appending the period of time and the date information to an end of the data of the impression entry in the example tagged impressions database 525. However, any other time format may additionally or alternatively be used. For example, the time stamper 560 may derive a local time (E.g., Central Standard Time (CSD)) from the UTC time stamp prior to recording the time stamp in the tagged impressions database 525.

Figure 6:
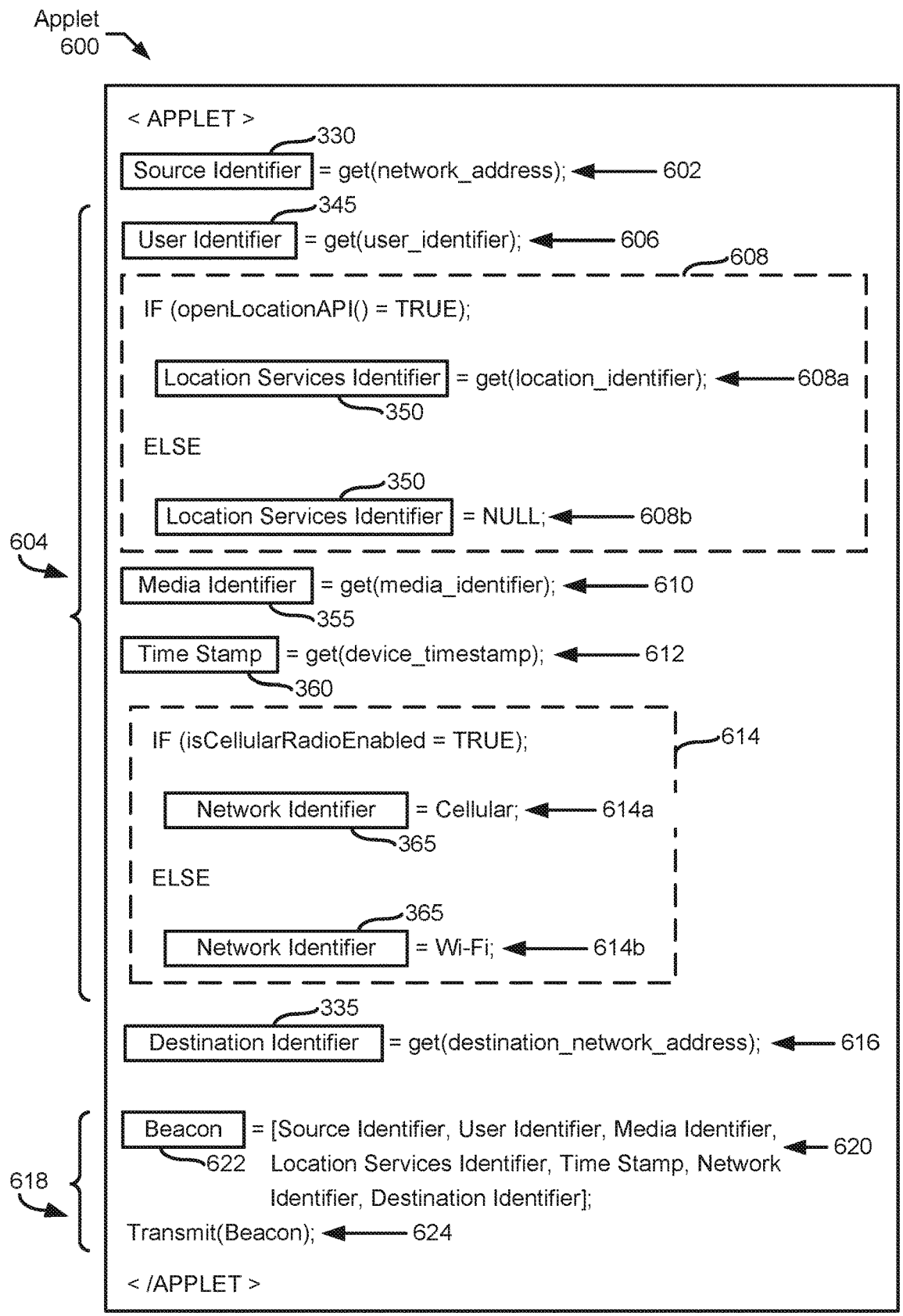
FIG. 6 is an example tag including pseudo code that may be executed to generate a beacon in response to accessing tagged media at a user device.

FIG. 6 is an example applet 600 including pseudo code that may be executed to generate a beacon including media monitoring information in response to a user device accessing tagged media. For example, the applet 600 may be embedded in the media 250 of FIG. 2. In the illustrated example of FIG. 6, the applet 600 includes an example source information defining line 602, an example media monitoring information retrieval section 604, an example destination information defining line 616 and an example beacon transmission section 618. The example source information defining line 602 of FIG. 6 retrieves the network address of the user device and stores the value for the source identifying information 330. In the illustrated example of FIG. 6, the media monitoring information retrieval section 604 defines the values of the media monitoring information (e.g., the user identifying information 345, the location services information 350, the media identifying information 355, the time stamp 360, and the network identifying information 365) included in the media monitoring information 340. For example, the media monitoring information retrieval section 604 includes an example user identifier defining line 606, an example location services identifier defining block 608, an example media identifier defining line 610, an example time stamp defining line 612 and an example network identifier defining block 614.

In the illustrated example, the user identifier defining line 606 retrieves user identification information (e.g., a media access control (MAC) address, an international mobile equipment identity (IMEI) number, a telephone number, etc. associated with the user device) and stores the value for the user identifying information 345.

The example location services identifier defining block 608 of FIG. 6 determines whether the user device 115 has access to a location application programming interface (API) and defines the value for the location services information 350 accordingly. For example, when the user device 115 has access to the location API, line 608a retrieves location services information (e.g., GPS coordinates) via the location API and stores the value for the location services information 350. Otherwise, if the user device 115 does not have access to the location API, line 608b stores a value indicating that no location services information is provided (e.g., a null or empty value, "False," "N/A," "0," etc.). In the illustrated example, the media identifier defining line 610 retrieves media identification information from the media 250 and stores the value for the media identifying information 355. In the illustrated example, the time stamp defining line 612 retrieves date and time information for the media request and stores the value for the time stamp 360.

The example network identifier defining block 614 of FIG. 6 determines whether the user device 115 is connected to a cellular network (e.g., a mobile network) or a Wi-Fi network (e.g., a fixed-location network) and defines the value for network identifying information 365 accordingly. For example, when the user device 115 enables communications via a cellular radio, line 614a stores a value for the network identifying information 365 indicating the network connection-type is a cellular network. Otherwise, if the user device 115 does not have the cellular radio enabled to communicate (e.g., the user device 115 communicates via a Wi-Fi network connection), line 614b stores a value for the network identifying information 365 indicating the network connection-type is a Wi-Fi network. In some examples, the applet 600 may not include the network identifier defining block 614.

In the illustrated example of FIG. 6, the example destination information defining line 616 retrieves the network address associated with the destination of the communication and stores the value for the destination identifying information 335. For example, the destination information defining line 616 may retrieve the Wi-Fi network-network address 315 of FIG. 3, the network address associated with the first example antenna 430a of FIG. 4, etc.

In the illustrated example of FIG. 6, the example applet 600 includes the example beacon transmission section 618 to generate a beacon and to transmit the generated beacon to, for example, the AME server 105. For example, using the source identifier 330, the media monitoring information 340 (e.g., the user identifier 345, the location services identifier 350, the media identifier 355, the time stamp 360 and the network identifier 365) and the destination identifier 335, example beacon generating line 620 defines an example beacon 622. At example beacon transmitting line 624, the applet 600 causes the user device 115 to transmit the beacon 622 to, for example, the AME server 105. In some examples, the applet 600 logs the beacon 622 and transmits one or more beacons at a later time. For example, the applet 600 may cause the user device 115 to periodically (e.g., every 24 hours) transmit logged beacons to the AME server 105.

FIG. 7 is an example data table 700 that may be stored by the example AME server 105 of FIGS. 1-4 and/or 5 to store tagged impressions. The example data table 700 of the illustrated example of FIG. 7 includes an impression identifier column 705, a source information column 710, a user identifier column 715, a location services identifier column 720, a media identifier column 725, a time stamp column 730, a network connection-type column 735, a location identifier column 740, a geographic location column 745 and a business location flag 750. The example impression identifier column 705 indicates an identifier of a tagged impression logged by the AME server 105. In the illustrated example, the impression identifier is a unique serial identifier. However, any other approach uniquely identifying an impression may additionally or alternatively be used.

The example source information column 710 indicates source identifying information such as a network address identifying the source of the corresponding beacon. The example user identifier column 715 identifies user identifying information associated with a user and/or a user device that accessed the tagged media. The example location services identifier column 720 identifies location services information corresponding to where the user and/or user device accessed the tagged media. In some examples, the location services information is provided by the user device (e.g., when the application requesting media has access to a positioning system of the user device) and/or by the mobile network provider (e.g., the logger 425 of FIG. 4).

The example media identifier column 725 identifies the tagged media that was accessed by the user device 115 and caused the media monitoring information to be communicated to the AME server 105. The example time stamp column 730 indicates a date and/or time at which the media was accessed at the user device 115. The example network connection-type column 735 indicates the type of network connection used to transmit the media monitoring information 340. The example location identifier column 740 identifies the reliable location identifier determined for the impression. The example geographic location column 745 identifies the geographic location corresponding to the location identifier. The example business location flag 750 indicates whether the geographic location associated with the impression is likely a business location.

The example data table 700 of the illustrated example of FIG. 7 includes three example rows 760, 770, 780 corresponding to three example tagged impression entries. The first example row 760 indicates that an impression having an identifier of "0001" was received from a router having a network address of "IPAddr 01," a user identifier of "User 01," did not include location services information and the media monitoring information corresponding to the impression was transmitted via a "Wi-Fi" network. The impression entry "0001" was logged at the AME server 105 in response to a user device accessing a "Host1.com" at 8:00 AM on Jan. 1, 2015. In addition, the location identifier "IPAddr 01" was determined to be a reliable location identifier and used to determine that the user and/or the user device was located in "Chicago, Ill." when accessing the media "Host1.com." Furthermore, the user and/or user device was likely not accessing the media "Host1.com" at a business location.

The second example row 770 indicates that an impression having an identifier of "0002" was received from a router having a network address of "IPAddr 02," a user identifier of "User 02," included location services information "Lat 2, Long 2" and the media monitoring information corresponding to the impression was transmitted via a "Cellular" network. The impression entry "0002" was logged at the AME server 105 in response to a user device accessing "Host2.com" at 9:15 AM on Jan. 2, 2015. In addition, the location identifier "Lat 2, Long 2" was determined to be a reliable location identifier and used to determine that the user and/or the user device was located in "Austin, Tex." when accessing the media "Host2.com." Furthermore, the user and/or user device was likely not accessing the media "Host2.com" at a business location.

The third example row 780 indicates that an impression having an identifier of "0043" was received from a router having a network address of "IPAddr 03," a user identifier of "User 03," did not include location services information and the media monitoring information corresponding to the impression was transmitted via a "Cellular" network. The impression entry "0043" was logged at the AME server 105 in response to a user device accessing "Host3.com" at 9:45 AM on Jan. 2, 2015. In addition, the location identifier "Lat 3, Long 3" was determined to be a reliable location identifier and used to determine that the user and/or the user device was located in "Dallas, Tex." when accessing the media "Host3.com." Furthermore, the user and/or user device was likely accessing the media "Host3.com" at a business location.

While three example tagged impression entries are represented in the example data table 700 of FIG. 7, more or fewer tagged impression entries may be represented in the example data table 700 corresponding to the many beacons received by the AME server 105.

FIG. 8 represents an example data table 800 that may be stored by the AME server 105 of FIGS. 1-4 and/or 5 representing profiles generated for users associated with tagged impressions. The example data table 800 of the illustrated example of FIG. 8 is stored in the example user profiles data store 135 of FIGS. 1 and/or 5. The example data table 800 of the illustrated example of FIG. 8 includes a user identifier column 805, a user home location column 810, a gender identifier column 815, an age identifier column 820, a presence of children identifier column 825 and a user interests identifier column 830. However, any other columns representing any other demographic information such as race, ethnicity, income, etc. may additionally or alternatively be used. Moreover, the example column(s) may be implemented in any other fashion. For example, the example age identifier column 820 of the illustrated example identifies an age range of the user. In some examples, the age identifier column 820 may store a birthdate of the user, such that an age of the user may be later calculated. The example user identifier column 805 of the illustrated example of FIG. 8 stores a user identifier associated with a user. However, in some examples, the example user identifier column 805 may store an altered and/or obfuscated version of the user identifier (e.g., a hashed version of the user identification information), an identifier of the user device (e.g., a MAC address) that transmitted the media monitoring information 340 received at the ANTF server 105, etc.

The example data table 800 of the illustrated example includes three example rows 850, 860, 870. The first example row 850 indicates that the user associated with the "User 01" identifier is male age 30-34, has no children, has a home location of Chicago, Ill., and is interested in cars and grilling. The second example second row 860 indicates that the user associated with the "User 02" identifier has a home location of Austin, Tex., but additional demographic information (e.g., gender, age, presence of children, interests) for the user is not known. The third example row 870 indicates that the user associated with the "User 03" identifier is a female age 35-39, has children, has an unknown home location, and is a sports fan. While three example rows 850, 860, 870 are shown corresponding to three example user devices in the illustrated example of FIG. 8, more or fewer user devices may be represented in the example data table 800 corresponding to the many users who access tagged media provided by the media provider and/or AME.

While an example manner of implementing the AME server 105 of FIGS. 1-3 and/or 4 is illustrated in FIG. 5, one or more of the elements, processes and/or devices illustrated in FIG. 5 may be combined, divided, re-arranged, omitted, eliminated and/or implemented in any other way. Further, the example tag handler 125, the example profile generator 130, the example user profiles data store 135, the example beacon handler 505, the example beacon parser 510, the example decrypter 515, the example tagged impression logger 520, the example tagged impressions database 525, the example network classifier 530, the example location identifier handler 535, the example location retriever 540, the example location mapper 545, the example geographic database 550, the example location classifier 555, the example time stamper 560 and/or, more generally, the example AME server 105 of FIG. 5 may be implemented by hardware, software, firmware and/or any combination of hardware, software and/or firmware. Thus, for example, any of the example tag handler 125, the example profile generator 130, the example user profiles data store 135, the example beacon handler 505, the example beacon parser 510, the example decrypter 515, the example tagged impression logger 520, the example tagged impressions database 525, the example network classifier 530, the example location identifier handler 535, the example location retriever 540, the example location mapper 545, the example geographic database 550, the example location classifier 555, the example time stamper 560 and/or, more generally, the example AME server 105 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s). When reading any of the apparatus or system claims of this patent to cover a purely software and/or firmware implementation, at least one of the example tag handler 125, the example profile generator 130, the example user profiles data store 135, the example beacon handler 505, the example beacon parser 510, the example decrypter 515, the example tagged impression logger 520, the example tagged impressions database 525, the example network classifier 530, the example location identifier handler 535, the example location retriever 540, the example location mapper 545, the example geographic database 550, the example location classifier 555, the example time stamper 560 and/or, more generally, the example AME server 105 of FIG. 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example AME server 105 of FIGS. 1-3 and/or 4 may include one or more elements, processes and/or devices in addition to, or instead of, those illustrated in FIG. 5, and/or may include more than one of any or all of the illustrated elements, processes and devices.

Figure 9:
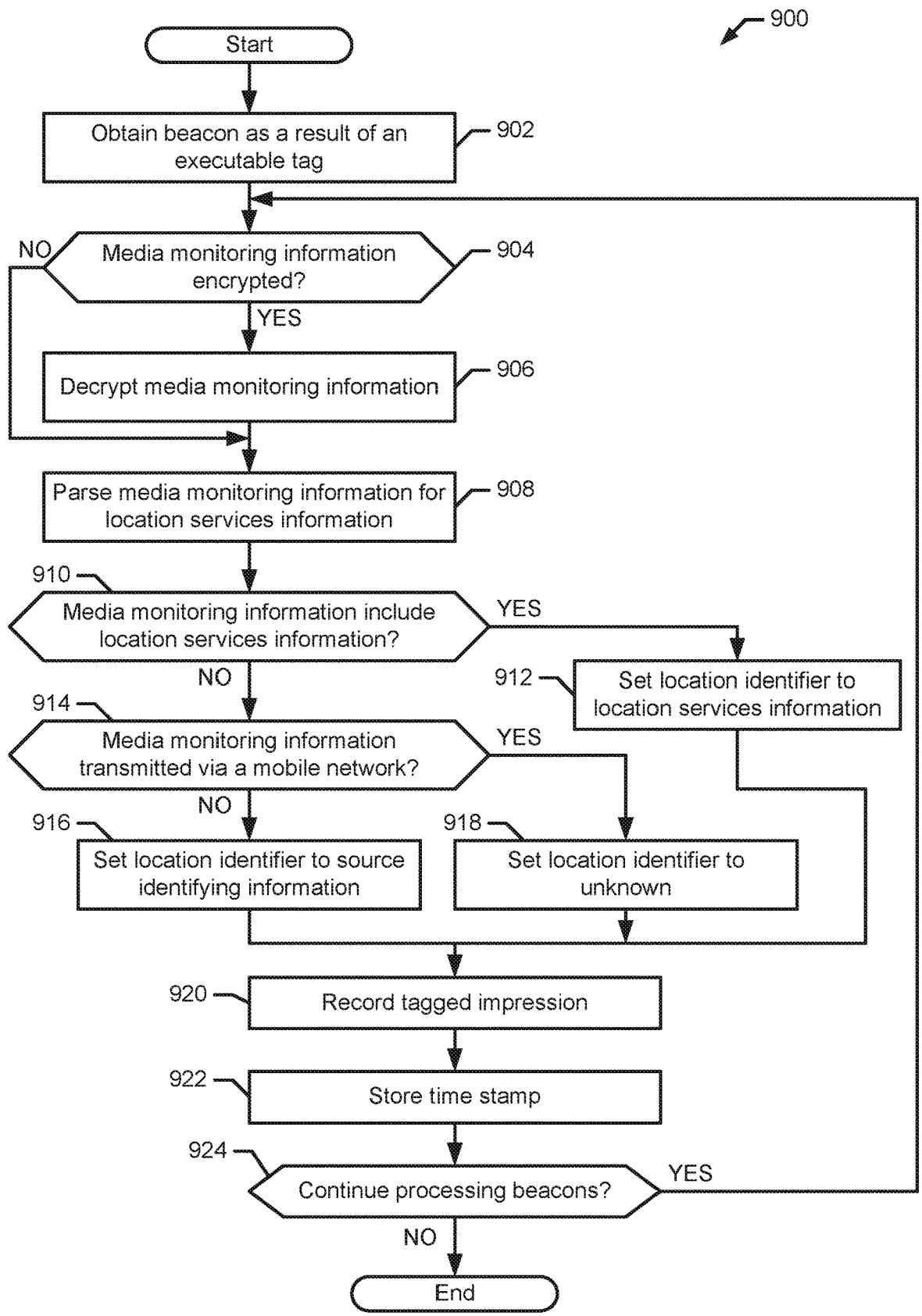
FIG. 9 is a flowchart representative of example machine-readable instructions that may be executed by the example audience measurement entity server of FIGS. 1-4 and/or 5 to identify a reliable location identifier that may be used to associate a geographic location with user devices.
Figure 10:
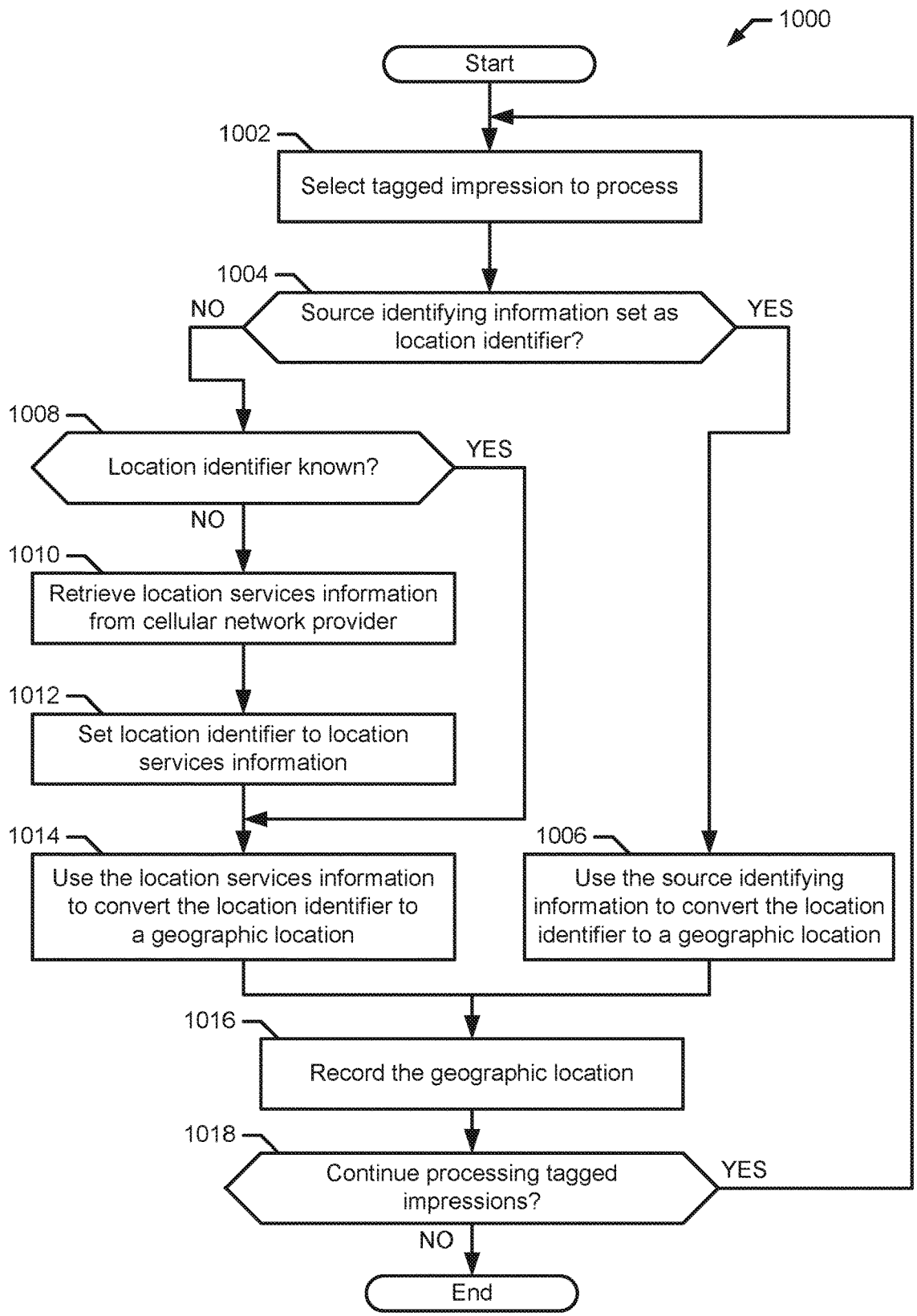
FIG. 10 is a flowchart representative of example machine-readable instructions that may be executed by the example audience measurement entity server of FIGS. 1-4 and/or 5 to associate a geographic location with a user device.
Figure 11:
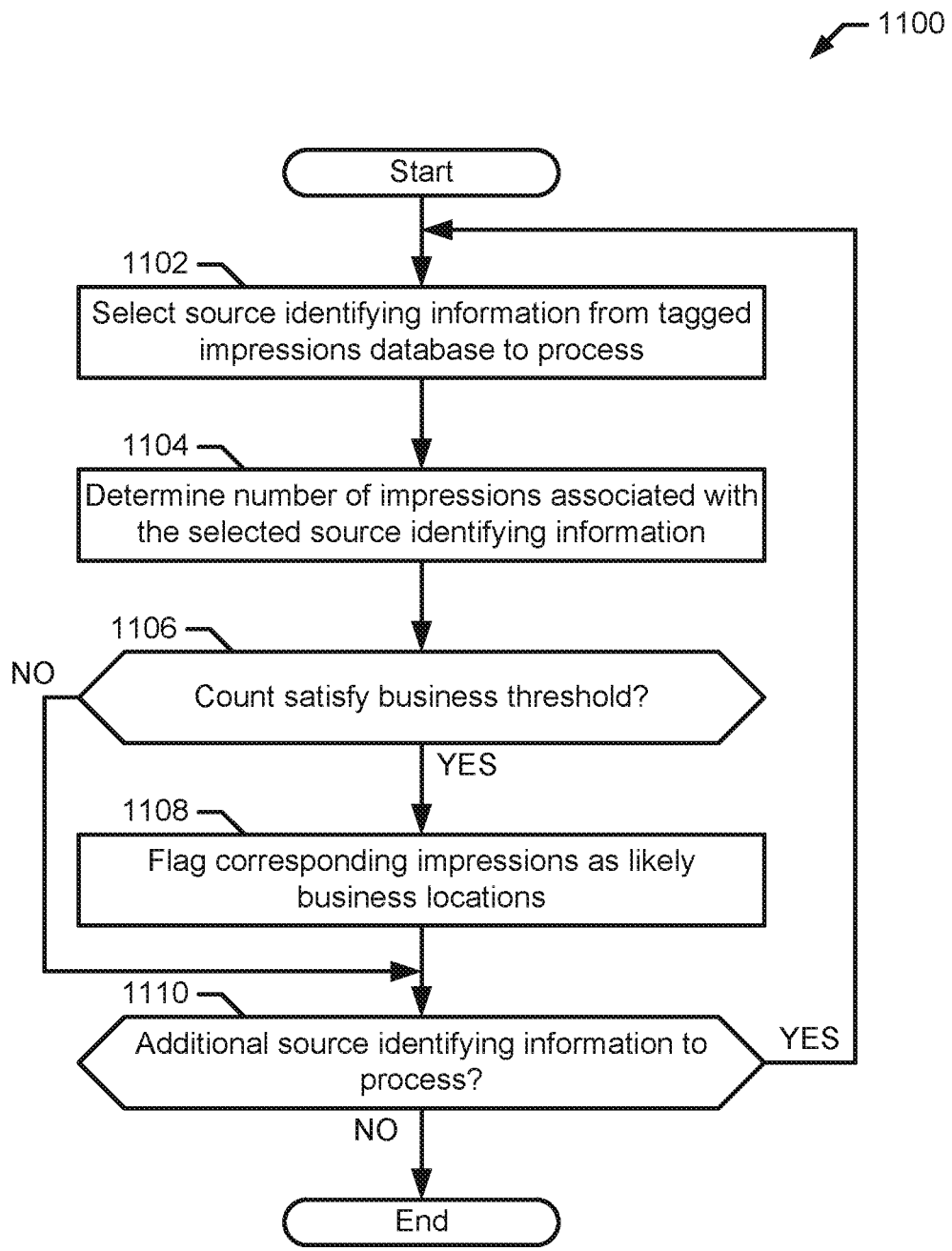
FIG. 11 is a flowchart representative of example machine-readable instructions that may be executed by the example audience measurement entity server of FIGS. 1-4 and/or 5 to identify source identifying information that may be associated with business locations.

Flowcharts representative of example machine readable instructions for implementing the example AME server 105 of FIGS. 1-4 and/or 5 are shown in FIGS. 9-11 and/or 12. In these examples, the machine readable instructions comprise a program(s) for execution by a processor such as the processor 1312 shown in the example processor platform 1300 discussed below in connection with FIG. 13. The program(s) may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program(s) is/are described with reference to the flowcharts illustrated in FIGS. 9-12, many other methods of implementing the example ANILE server 105 of FIGS. 1-4 and/or 5 may alternatively be used. For example, the order of execution of the blocks may be changed, and/or some of the blocks described may be changed, eliminated, or combined.

As mentioned above, the example processes of FIGS. 9-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. "Comprising" and all other variants of "comprise" are expressly defined to be open-ended terms. "Including" and all other variants of "include" are also defined to be open-ended terms. In contrast, the term "consisting" and/or other forms of "consist" are defined to be close-ended terms.

The example program 900 of FIG. 9 initiates logging tagged impressions at the example AME server 105 (FIGS. 1-4 and/or 5). The example program 900 of FIG. 9 begins at block 902 when the beacon handler 505 (FIG. 5) receives the beacon 260 including media monitoring information 340 from the user device 115. For example, the user device 115 may communicate the media monitoring information 340 in response to executing the tag 250 (e.g., executable instructions) included in the media 250 being accessed by the user device 115. In some examples, the beacon handler 505 transmits an acknowledgement message to the user device 115 in response to receiving the beacon 260. In other examples, the beacon handler 505 provides no response, but the data contained in the beacon 260 (e.g., the source identifying information 330, the media monitoring information 340, a cookie, etc.) is logged.

At block 904, the example beacon parser 510 (FIG. 5) determines whether the media monitoring information 340 included in the beacon 260 is encrypted. For example, location services information 350 included in the beacon 260 may be encrypted using advanced encryption standard (AES) algorithms to protect the privacy of the user. If, at block 904, the beacon parser 510 determines that media monitoring information 340 is encrypted, then, at block 906, the example decrypter 515 (FIG. 5) decrypts the media monitoring information 340. For example, the decrypter 515 may use AES algorithms to decrypt the media monitoring information 340.

If, at block 904, the beacon parser 510 determined that the media monitoring information 340 was not encrypted or after the decrypter 515 decrypted the media monitoring information 340 at block 906, control proceeds to block 908 at which the beacon parser 510 parses the media monitoring information 340 for location services information 350. If, at block 910, the beacon parser 510 finds location services information 350 (e.g., the user device 115 and/or the example logger 425 (FIG. 4) inserted GPS coordinates in the media monitoring information 340), then, at block 912, the beacon parser 510 extracts the location services information 350 and the example location identifier handler 535 (FIG. 5) sets the location identifier using the locations services information. The location identifier may be used by the ANTE server 105 to reliably associate the user and/or the user device to a geographic location. Control then proceeds to block 920 to record a tagged impression entry.

If, at block 910, the beacon parser 510 did not find location services information 350, then, at block 914, the AME server 105 determines whether the media monitoring information 350 received at the AME server 105 was transmitted via a fixed-location network (e.g., a Wi-Fi network) or a mobile network (e.g., a cellular network). For example, the example network classifier 530 (FIG. 5) may identify network identifying information 365 indicating whether a Wi-Fi network or a cellular network was used by the user device 115 to transmit the media monitoring information 340. In some examples, the network classifier 530 deter mines the network connection-type based on whether the media monitoring information 340 includes location services information.

If, at block 914, the network classifier 530 determined that the media monitoring information 340 was not transmitted by the user device 115 via a mobile network (e.g., the user device 115 transmitted the media monitoring information 340 via a fixed-location network), then, at block 916, the beacon parser 510 extracts the source identifying information 330 (e.g., a network address) associated with the beacon 260 and the location identifier handler 535 sets the location identifier using the source identifying information 330. Control then proceeds to block 920 to record a tagged impression entry.

If, at block 914, the network classifier 530 determined that the user device 115 transmitted the media monitoring information 340 via a mobile network, then, at block 918, the location identifier handler 353 sets the location identifier as unknown. At block 920, the example tagged impression logger 520 (FIG. 5) stores a record of the media monitoring information 340 included in the beacon 260 in the example tagged impressions database 525 (FIG. 5). For example, the beacon parser 510 may extract media identifying information 355 (e.g., a URL address, a vendor identifier, etc.) that may be included in the media monitoring information 340.

At block 922, the example time stamper 560 (FIG. 5) associates a time period (e.g., 1:00 AM Coordinated Universal Time (UTC) to 1:01 AM UTC) and/or date (e.g., Jan. 1, 2015) with the tagged media impression. For example, the time stamper 560 may append the period of time and/or date information to an end of the impression entry in the tagged impressions database 525.

At block 924, the AME server 105 determines whether to continue processing beacons. If, at block 924, the AME server 105 determined to continue processing beacons (e.g., the beacon handler 505 is receiving beacons), control returns to block 904 to determine whether the media monitoring information 340 included in the next beacon is encrypted. Otherwise, if, at block 924, the AME server 105 determined to end processing beacons (e.g., due to a server shutdown event, etc.), the example process 900 of FIG. 9 ends.

The example program 1000 of FIG. 10 maps the tagged impression entries to geographic locations based on reliable location identifiers determined by the example AME server 105 (FIGS. 1-4 and/or 5). The example program 1000 of FIG. 10 begins at block 1002 when the example location mapper 545 (FIG. 5) identifies a tagged impression to be processed. For example, the location mapper 545 may periodically, aperiodically and/or as a one-time event, parse the tagged impressions in the example tagged impressions database 525 (FIG. 5) and select an impression entry to process. At block 1004, the location mapper 545 determines whether the location identifier stored for the impression is source identifying information or location services information. If, at block 1004, the location mapper 545 determined that the location identifier is source identifying information (e.g., a network address), then, at block 1006, the location mapper 545 access the example geographic database 550 (FIG. 5) to convert the source identifying information to a geographic location. In some examples, the location mapper 545 may access a source identifying information-to-geographic locations data structure to convert the source identifying information to a geographic location.

If, at block 1004, the location mapper 545 determined that that the location identifier for the selected impression entry is not source identifying information, then, at block 1008, the location mapper 545 determines whether the location identifier is known. For example, the user device 115 may not have access to a location API when generating the media monitoring information 340. If, at block 1008, the location mapper 545 determined that the location identifier for the selected impression entry is not known (e.g., the value is unknown), then, at block 1010, the AME server 105 retrieves location services information from the example cellular network provider 416 (FIG. 4). For example, the example location retriever 540 (FIG. 5) may generate the example query 440 requesting location services information (e.g., GPS coordinates) from the cellular network provider 416 (e.g., via the example logger 425 of FIG. 4) using the user identifying information 345 and/or the time stamp 360 associated with the selected impression entry.

At block 1012, the location retriever 540 sets the location identifier for the selected tagged impression entry using the locations services information returned by the cellular network provider 416. After the location retriever 540 sets the location identifier for the selected impression entry at block 1012 or, if the location mapper 545 determined that the location identifier for the selected impression was known at block 1008, then, at block 1014, the location mapper 545 accesses the example geographic database 550 to convert the location services information to a geographic location. In some examples, the location mapper 545 may access a location services information-to-geographic locations data structure to convert the location services information to a geographic location.

At block 1016, the location mapper 545 records the geographic location for the selected impression. At block 1018, the AME server 105 determines whether to continue processing impressions. If, at block 1018, the AME server 105 determined to continue processing impressions (e.g., the tagged impressions database 525 includes one or more impressions that are not associated with a geographic location), control returns to block 1002 to select another tagged impression to process. Otherwise, if, at block 1018, the AME server 105 determined to end processing impression (e.g., due to a server shutdown event, etc.), the example process 1000 of FIG. 10 ends.

The example program 1100 of FIG. 11 flags impressions in the example tagged impressions database 525 (FIG. 5) at the example AME server 105 (FIGS. 1-4 and/or 5) that are associated with business locations based on source identifying information (e.g., network addresses). The example program 1100 of FIG. 11 begins at block 1102 when the example location classifier 555 (FIG. 5) selects a source identifier (e.g., a network address) from the tagged impressions database 525 to process. At block 1104, the location classifier 555 determines a count for the number of impressions in the tagged impressions database 525 with the selected source identifier. For example, the location classifier 555 may count the number of impression entries associated with the selected source identifier. Additionally or alternatively, the location classifier 555 may count the number of impression entries associated with user devices typically associated with enterprise/business use.

If, at block 1106, the location classifier 555 determined that the count satisfies a business threshold, then, at block 1108, the location classifier 555 flags the impressions in the logged impressions database 525 with the corresponding source identifying information as likely business locations. For example, the count may satisfy the business threshold when the number of impressions associated with the selected source identifier is greater than or equal to the business threshold.

If, at block 1106, the location classifier 555 determined that the count for the number of impressions in the tagged impressions database 525 associated with the selected source identifier did not satisfy the business threshold (e.g., the number of impressions associated with the selected source identifier is less than business threshold), or, after the location classifier 555 flagged the impressions in the tagged impressions database 525 at block 1108, then, at block 1110, the location classifier 555 determines whether there is other source identifying information in the tagged impressions database 525 to process.

If, at block 1110, the location classifier 555 determined there is other source identifying information to process, control returns to block 1102 to select another source identifier from the tagged impressions database 525 to process. Otherwise, if, at block 1110, the location classifier 555 determined that there is no other source identifying information to process, the example process 1100 of FIG. 11 ends.

Figure 12:
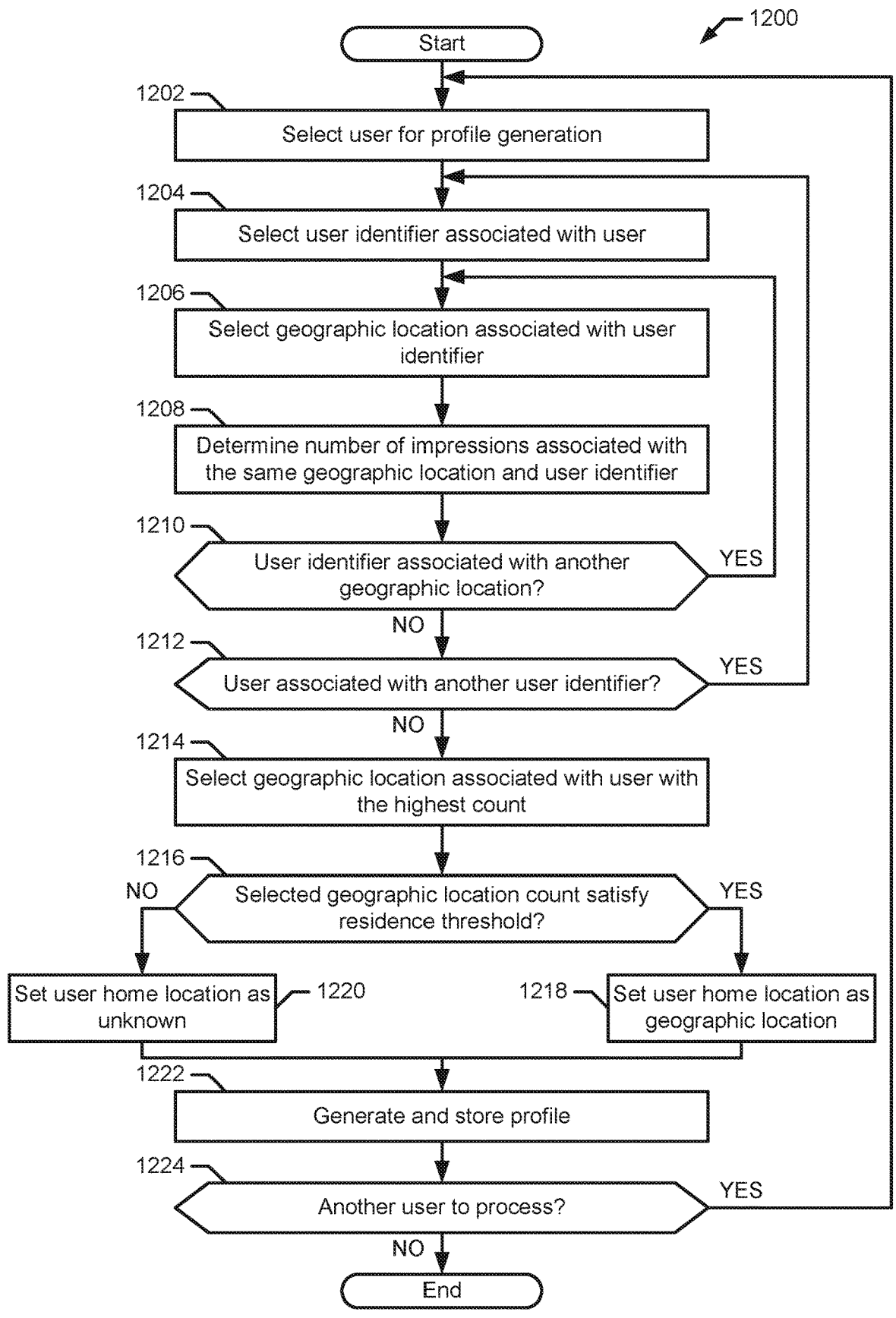
FIG. 12 is a flowchart representative of example machine-readable instructions that may be executed by the example audience measurement entity server of FIGS. 1-4 and/or 5 to generate a profile for a user associated with accessing tagged media.

The example program 1200 of FIG. 12 generates profiles for users based on geographic location counts associated with the respective users at the example AME server 105 (FIGS. 1-4 and/or 5). The example program 1200 of FIG. 12 begins at block 1202 when the example profile generator 130 (FIGS. 1 and/or 5) selects a user for which to generate a profile. For example, the profile generator 130 may select a user in response to a request from, for example, a media provider. At block 1204, the example profile generator 130 selects user identifying information (e.g., a user identifier) associated with the user from the example tagged impressions database 525 (FIG. 5). At block 1206, the profile generator 130 selects a geographic location associated with the selected user identifier. At block 1208, the profile generator 130 determines the number of impressions in the tagged impressions database 525 that are associated with the selected geographic location and the selected user identifier. For example, the profile generator 130 may count the number of impressions in the tagged impressions database 525 indicating that the user and/or user device associated with the user identifying information "User 01" is in Chicago, Ill.

At block 1210, the example profile generator 130 determines whether there is another geographic location associated with the user identifier. For example, a user who travels may have a user identifier that is associated with two or more geographic locations. Additionally or alternatively, depending on the granularity of the geographic locations in the example geographic location database 550 (FIG. 5), a user identifier may be associated with two or more geographic locations (e.g., neighborhoods) within a same general geographic area (e.g., a city). For example, a user living in Chicago may have one or more impressions associated with the "Downtown" neighborhood of the Chicago geographic location (e.g., where the user works) and one or more impressions associated with the "Logan Square" neighborhood of the Chicago geographic location (e.g., where the user lives). If, at block 1210, the profile generator 130 determined that the user identifier is associated with another geographic location, control returns to block 1206 to select another geographic location to process.

If, at block 1210, the profile generator 130 determined that the user identifier is not associated with another geographic location, then, at block 1212, the profile generator 130 determines whether the user is associated with another user identifier. For example, a user may be associated with two or more user devices (e.g., a laptop and smartphone). In some such examples, user identifying information corresponding to the respective user devices (e.g., a laptop MAC address and a smartphone MAC address) may be associated with the same user. If, at block 1212, the profile generator 130 determined that the user is associated with another user identifier, control returns to block 1204 to select another user identifier to process.

If, at block 1212, the profile generator 130 determined that the user is not associated with another user identifier, then, at block 1214, the profile generator 130 selects a geographic location associated with the user having the highest number of impressions. At block 1216, the profile generator 130 determines whether the count satisfies a residence threshold. If, at block 1216, the profile generator 130 determined that the count satisfied a residence threshold, then, at block 1218, the profile generator 130 sets the user home location to the geographic location.

If, at block 1216, the profile generator 130 determined that the count did not satisfy a residence threshold, then, at block 1220, the profile generator 130 sets the user home location as unknown. At block 1222, the profile generator 130 generates the profile and stores the generated profile in the example user profiles data store 135 (FIGS. 1 and/or 5). At block 1224, the profile generator 130 determines whether there is another user to process (e.g., generate a profile for). If, at block 1224, the profile generator 130 determined that there is another user to process, control returns to block 1202 to select another user for which to generate a profile. Otherwise, if, at block 1224, the profile generator 130 determined there was not another user to process, the example process 1200 of FIG. 12 ends.

Figure 13:
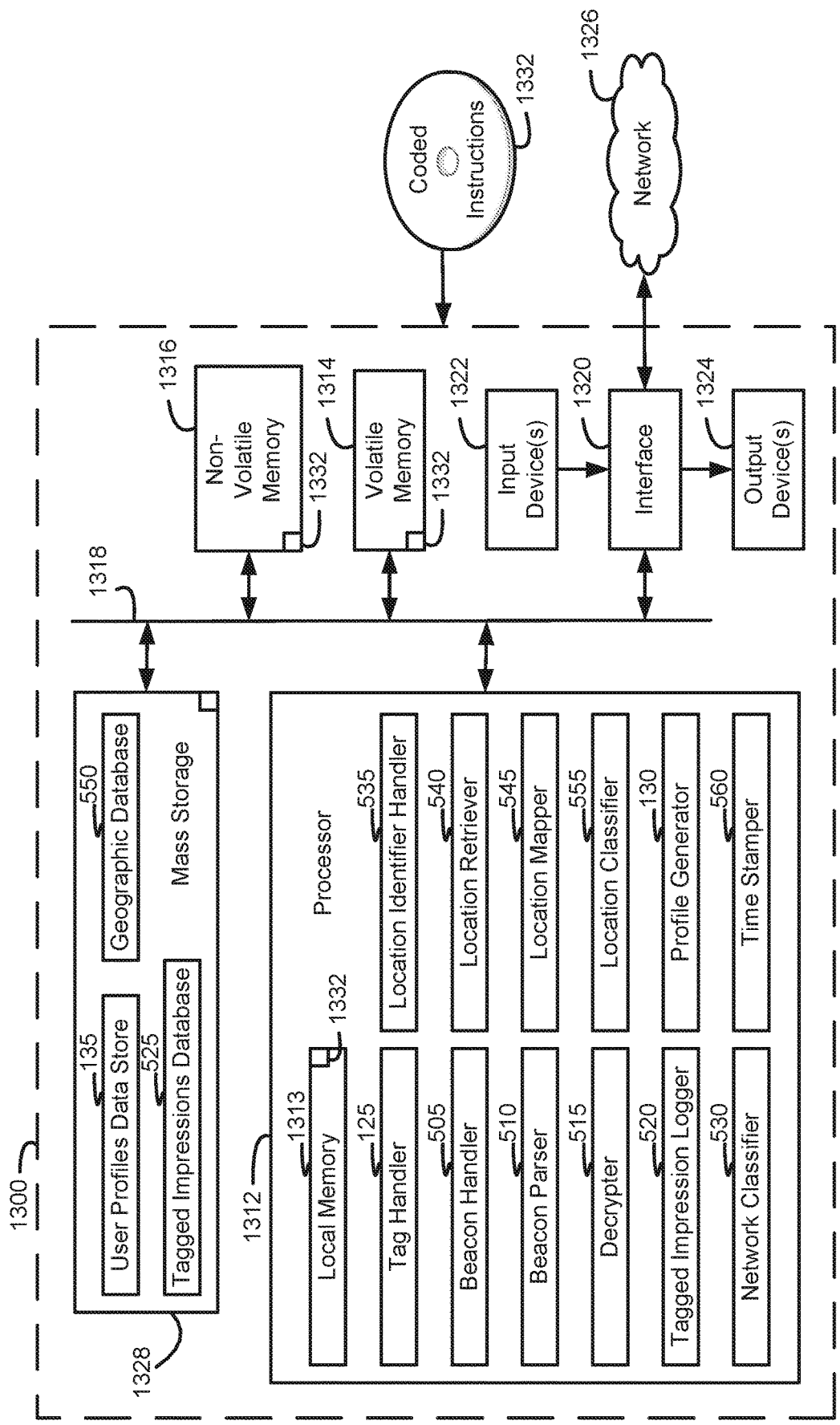
FIG. 13 is a block diagram of an example audience measurement server structured to execute the example machine-readable instructions of FIGS. 9-11 and/or 12 to implement the example audience measurement entity server of FIGS. 1-4 and/or 5.

FIG. 13 is a block diagram of an example processor platform 1300 capable of executing the instructions of FIGS. 9-11 and/or 12 to implement the AME server 105 of FIGS. 1-4 and/or 5. The processor platform 1300 can be, for example, a server, a personal computer, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example executes the instructions to implement the example tag handler 125, the example profile generator 130, the example beacon handler 505, the example beacon parser 510, the example decrypter 515, the example tagged impression logger 520, the example network classifier 530, the example location identifier handler 535, the example location retriever 540, the example location mapper 545, the example location classifier 555 and the example time stamper 560. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. The example mass storage 1328 implements the example user profiles data store 135, the example tagged impressions database 525 and the example geographic database 550.

The coded instructions 1332 of FIGS. 9-11 and/or 12 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods, apparatus and articles of manufacture enable accurately associating geographic locations with user devices. Examples disclosed herein operate based on media monitoring information included in beacons received at an audience measurement entity (ANTE) server. Examples disclosed herein parse the media monitoring information and determine a reliable location identifier of a geographic location to associate with the corresponding user device. An example advantage of examples disclosed herein is that the reliable location identifier may be selected based on a network connection-type that was used to transmit the media monitoring information from the user device to the AME server. Thus, examples disclosed herein enable choosing a location identifier that more accurately corresponds to the geographic location of the user and/or the user device accessing tagged media.

It is noted that this patent claims priority from U.S. Provisional Patent Application Ser. No. 62/155,986, which was filed on May 1, 2015, entitled "Methods and Apparatus to Associate Geographic Locations with Mobile Devices," and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to associate a geographic location with a user device, the apparatus comprising:
   means for classifying a network that connects a user device to an audience measurement entity based on source identifying information transmitted from the user device;
   means for determining a geographic location associated with an impression indicated by media identifying information based on a means of identifying a location determined based on at least one of:
   a network address included in the source identifying information and a first mapping that maps the network address to the geographic location when the network is a fixed network; and location services information included in the source identifying information and a second mapping that maps the location services information to the geographic location when the network is a mobile network; and means for classifying the geographic location of the user device as a home location based on a timestamp associated with the impression, the timestamp retrieved from a database of user profiles.

2. The apparatus of claim 1, further including means for crediting media with an impression by logging the source identifying information, media identifying information, and the geographic location.

3. The apparatus of claim 1, wherein the source identifying information transmitted from the user device is transmitted to the audience measurement entity via a beacon.

4. The apparatus of claim 3, further including means for decrypting the source identifying information from the beacon to identify the means of identifying a location when the source identifying information is encrypted.

5. The apparatus of claim 3, wherein location services information is embedded in the beacon transmitted from the user device to the audience measurement entity.

6. The apparatus of claim 1, wherein the means for classifying the geographic location of the user device include means for determining if the geographic location matches a user location stored in a matching user profile.

7. The apparatus of claim 6, wherein the means for classifying the geographic location of the user device include means for storing an indication in the matching user profile that the user location is a home location, when a number of times that an identified location matches the user location meets a threshold.

8. An apparatus for associating a geographic location with a user device, the apparatus comprising:

means for extracting source identifying information from a beacon transmitted from a user device to an audience measurement entity in response to the user device accessing a webpage;

means for extracting media identifying information from the beacon;

means for classifying a network that connects the user device to the audience measurement entity based on the source identifying information;

means for querying, in response to determining that the network is a mobile network, a location service of a provider of the mobile network to retrieve a location associated with the user device; and means for storing the location in association with the media identifying information to credit an impression of the media identifying information to the location.

9. The apparatus of claim 8, further including means for accessing a geographic database including a list of location identifiers to map the location associated with the user device to a corresponding geographic location.

10. The apparatus of claim 9, further including means for crediting the media with an impression by logging the source identifying information, media identifying information, and the geographic location.

11. The apparatus of claim 9, further including means for querying a database of user profiles based on a user identifier included in the beacon to identify a matching user profile.

12. The apparatus of claim 11, further including means for determining if the geographic location matches a user location stored in the matching user profile.

13. The apparatus of claim 12, further including means for storing an indication in the user profile that the user location is a home location, in response to a number of times that an identified location matches the user location meets a threshold.

14. The apparatus of claim 9, further including means for classifying the geographic location of the user device as a home location based on a timestamp associated with the credited impression.

15. The apparatus of claim 9, further including means for decrypting identifying information to identify the location identifiers when means for extracting source identifying information and means for extracting media identifying information determine that the media identifying information is encrypted.

16. The apparatus of claim 8, wherein location services information is not embedded in the beacon transmitted from the user device to the audience measurement entity.

* * * * *